US011588322B2

(12) United States Patent
Gajanayake et al.

(10) Patent No.: US 11,588,322 B2
(45) Date of Patent: Feb. 21, 2023

(54) FAULT DETECTION FOR A SOLID STATE POWER CONVERTER

(71) Applicants: Rolls-Royce North American Technologies, Inc., Indianapolis, IN (US); Rolls-Royce Singapore Pte. Ltd., Singapore (SG)

(72) Inventors: Chandana Jayampathi Gajanayake, Singapore (SG); Yu Yang, Singapore (SG); David Loder, Carmel, IN (US); Amit Kumar Gupta, Singapore (SG)

(73) Assignees: Rolls-Royce North American Technologies, Inc., Indianapolis, IN (US); Rolls-Royce Singapore Pte. Ltd., Singapore (SG)

( * ) Notice: Subject to any disclaimer, the term of this patent is extended or adjusted under 35 U.S.C. 154(b) by 14 days.

(21) Appl. No.: 17/100,225

(22) Filed: Nov. 20, 2020

(65) Prior Publication Data

US 2022/0166211 A1 May 26, 2022

(51) Int. Cl.
*H02H 7/12* (2006.01)
*H02H 7/125* (2006.01)
(Continued)

(52) U.S. Cl.
CPC ........ *H02H 7/1213* (2013.01); *H02H 1/0007* (2013.01); *H02H 7/125* (2013.01); *H02M 3/07* (2013.01)

(58) Field of Classification Search
CPC .... H02H 7/1213; H02H 1/0007; H02H 1/125; H02H 7/125; H02M 3/07
See application file for complete search history.

(56) References Cited

U.S. PATENT DOCUMENTS

| 4,733,321 A | 3/1988 | Lindeperg |
| 5,986,902 A * | 11/1999 | Brkovic ............... H02H 7/1213 |
| | | 323/276 |

(Continued)

FOREIGN PATENT DOCUMENTS

| WO | 2009056432 A1 | 5/2009 |
| WO | 2015097394 A1 | 7/2015 |

OTHER PUBLICATIONS

Bai, "Current Derivative Based Fault Detection and Localization in a Ring Bus DC Microgrid", Mar. 2020, 101 pgs.
(Continued)

*Primary Examiner* — Scott Bauer
(74) *Attorney, Agent, or Firm* — Shumaker & Sieffert, P.A.

(57) ABSTRACT

In some examples, this disclosure describes a method for detecting a fault in an electrical power system comprising a bus connected between a first solid state power converter and a second solid state power converter. The method includes receiving, at a controller of the electrical power system, a first signal indicating a current at a source side of the first solid state power converter, wherein the source side of the first solid state power converter is connected to a power source of the electrical power system. The method also includes receiving, at the controller, a second signal indicating a current at the bus and determining, by the controller, that a fault occurred in the electrical power system based on the first signal and further based on the second signal. The method further includes controlling the first solid state power converter in response to determining that the fault occurred.

20 Claims, 12 Drawing Sheets

(51) Int. Cl.
  *H02H 1/00* (2006.01)
  *H02M 3/07* (2006.01)

(56) References Cited

U.S. PATENT DOCUMENTS

| | | | |
|---|---|---|---|
| 6,559,689 B1 | 5/2003 | Clark | |
| 9,908,489 B2 | 3/2018 | Shipley et al. | |
| 10,693,367 B1 | 6/2020 | Chatterjee et al. | |
| 11,011,991 B1* | 5/2021 | Mercer | H02M 1/15 |
| 2004/0061537 A1* | 4/2004 | Flasza | H02J 7/345 |
| | | | 327/157 |
| 2007/0183174 A1 | 8/2007 | Lee | |
| 2009/0102405 A1* | 4/2009 | Hwang | H02P 29/60 |
| | | | 318/400.15 |
| 2009/0121781 A1 | 5/2009 | Oyama et al. | |
| 2010/0045102 A1* | 2/2010 | Kitanaka | H02M 3/1582 |
| | | | 323/311 |
| 2010/0228413 A1* | 9/2010 | Fujitake | B60W 20/10 |
| | | | 180/65.265 |
| 2010/0312505 A1 | 12/2010 | Berger et al. | |
| 2011/0241766 A1 | 10/2011 | Zhang et al. | |
| 2012/0200966 A1 | 8/2012 | Hill et al. | |
| 2013/0088802 A1 | 4/2013 | Berggren et al. | |
| 2014/0132169 A1* | 5/2014 | Boeke | H05B 45/3725 |
| | | | 307/22 |
| 2019/0312514 A1 | 10/2019 | Hukel | |

OTHER PUBLICATIONS

Chang et al., "Review of different fault detection methods and their impact on pre-emptive VSC-HVDC dc protection performance", Aug. 2017, 9 pgs.
Jamali et al., "A High-Speed Fault Detection, Identification, and Isolation Method for a Last Mile Radial LVDC Distribution Network", Oct. 2018, 20 pgs.
Marvik et al., "Analysis of grid faults in offshore wind farm with HVDC connection", Jan. 2013, 10 pgs.
Raza et al. "A Protection Scheme for Multi-Terminal VSC-HVDC Transmission Systems", Dec. 2017, 8 pgs.
Yaqobi et al., "Low-Voltage Solid-State DC Breaker for Fault Protection Applications in Isolated DC Microgrid Cluster", Feb. 2019, 13 pgs.
Zhang et al., "A review on protection of DC microgrids", Mar. 2018, 15 pgs.
U.S. Appl. No. 16/951,269, by Rolls-Royce North American Technologies, Inc. (Inventors: Yang et al.), filed Nov. 18, 2020.

* cited by examiner

FAULT DETECTION FOR A SOLID STATE POWER CONVERTER

TECHNICAL FIELD

This disclosure relates to electrical power systems.

BACKGROUND

An electrical power system may include one or more power sources and one or more loads separated by one or more solid state power converters. In a bidirectional electrical power system, a solid state power converter may allow power to flow in either direction between the power source and the load. The solid state power converter may include a set of source-side switches and a set of load-side switches, with an optional middle capacitor connected between the source-side switches and the load-side switches.

SUMMARY

This disclosure describes techniques for detecting a fault in an electrical power system that includes at least two solid state power converters and at least two controllers. The controllers may be configured to receive signals indicating the current at the source side on electrical power system, on the bus between the two converters, and at the load side of the electrical power system. Based on one or more of the received signals, one of the controllers can determine that a fault has occurred in the electrical power system.

The techniques of this disclosure may allow for faster and more accurate detection of a fault, as compared to existing techniques that use a signal received from only one sensor on a single solid state power converter. A controller implementing the techniques of this disclosure may be able to determine the location of the fault, and the controller may be configured to deactivate some of the switches in the system to protect components from the fault.

In some examples, this disclosure describes a method for detecting a fault in an electrical power system comprising a bus connected between a first solid state power converter and a second solid state power converter. The method includes receiving, at a controller of the electrical power system, a first signal indicating a current at a source side of the first solid state power converter, wherein the source side of the first solid state power converter is connected to a power source of the electrical power system. The method also includes receiving, at the controller, a second signal indicating a current at the bus and determining, by the controller, that a fault occurred in the electrical power system based on the first signal and further based on the second signal. The method further includes controlling, by the controller, the first solid state power converter in response to determining that the fault occurred.

In some examples, a system includes a first solid state power converter including a first set of switches connected to a source side of the first solid state power converter, a second set of switches connected to a bus side of the first solid state power converter, and a first middle capacitor connected between the first set of switches and the second set of switches. The system also includes a second solid state power converter including a third set of switches connected to a bus side of the second solid state power converter, a fourth set of switches connected to a load side of the second solid state power converter, a second middle capacitor connected between the third set of switches and the fourth set of switches. The system further includes a power source connected to the source side of the first solid state power converter. The system includes a bus connected to the bus side of the first solid state power converter and to the bus side of the second solid state power converter. The system also includes a load connected to the load side of the second solid state power converter.

In some examples, a device comprising a computer-readable storage medium having executable instructions stored thereon, configured to be executable by processing circuitry of the device for causing the processing circuitry to receive a first signal indicating a current at a source side of a first solid state power converter of an electrical power system, wherein the source side of the first solid state power converter is connected to a power source of the electrical power system. The instructions are configured to be executable by the processing circuitry for further causing the processing circuitry to receive a second signal indicating a current at a bus connected between the first solid state power converter and a second solid state power converter of the electrical power system. The instructions are further configured to be executable by the processing circuitry for further causing the processing circuitry to determine that a fault occurred in the electrical power system based on the first signal and further based on the second signal. The instructions are configured to be executable by the processing circuitry for also causing the processing circuitry to control the first solid state power converter or the second solid state power converter in response to determining that the fault occurred.

The details of one or more examples are set forth in the accompanying drawings and the description below. Other features, objects, and advantages will be apparent from the description and drawings, and from the claims.

DETAILED DESCRIPTION

Figure 1:
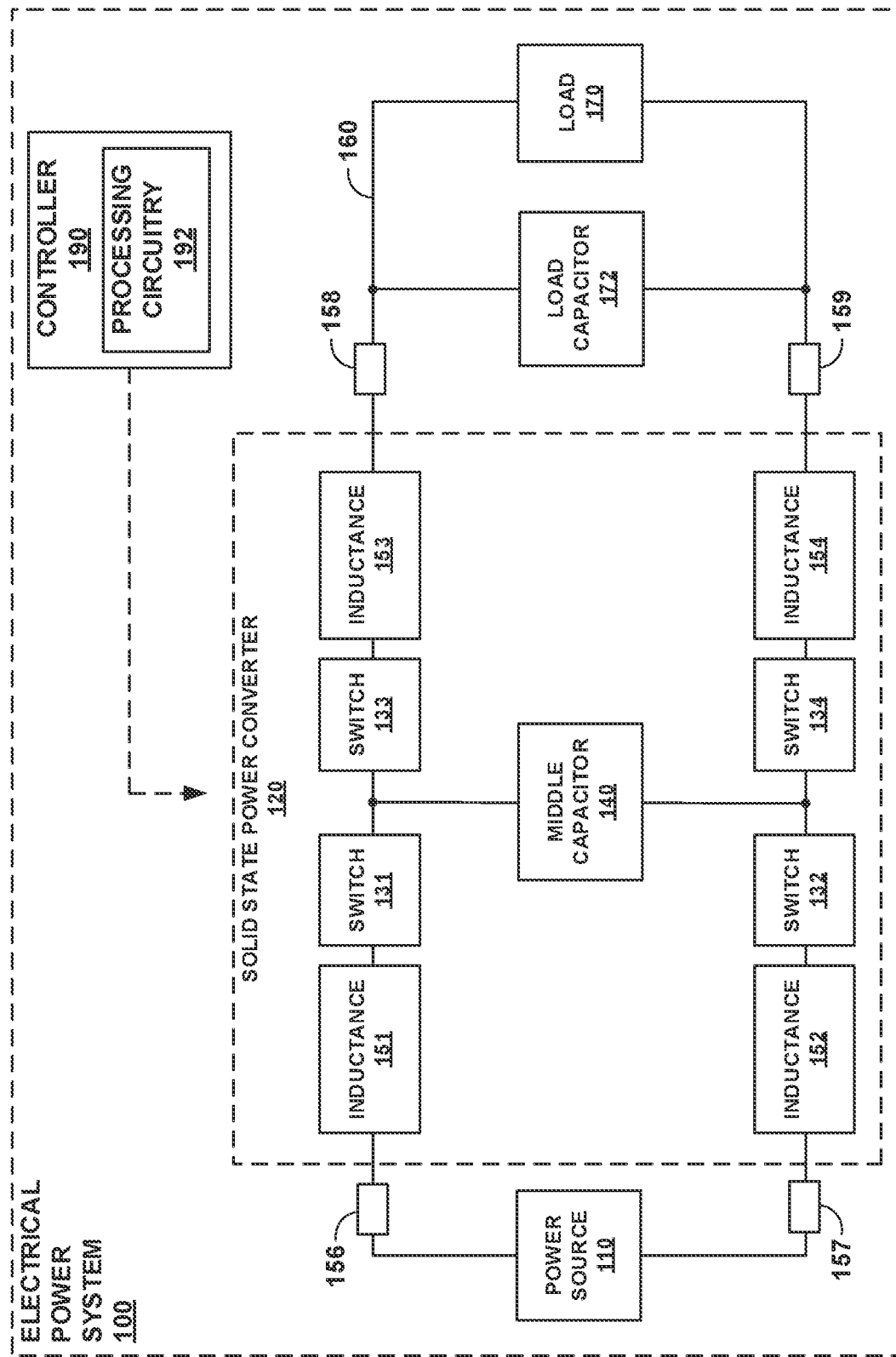
FIG. 1 is a conceptual block diagram illustrating an electrical power system including a solid state power converter and a controller, in accordance with one or more techniques of this disclosure.

This disclosure describes techniques for detecting a fault based on signals received from current sensors in an electrical power system. The techniques of this disclosure can be used by a controller in an electrical power system that includes at least two solid state power converters with a bus connected between the converters. The controller may be configured to quickly detect the occurrence and/or location of a fault within the electrical power system using the techniques of this disclosure.

In some examples, a first controller receives a first current-sense signal from a source side of a first solid state power converter and a second current-sense signal from a bus connected between the first solid state power converter and a second solid state power converter. A second controller can receive a third current-sense signal from a load side of the solid state power converter and a fourth current-sense signal from the bus. The first and second controllers may be configured to detect a fault based on magnitudes of one or more of the current-sense signals. The controllers may also be configured to determine the location of the fault based on magnitudes of the current-sense signals.

The middle capacitor of one or more of the solid state power converter may be sized to allow for more effective detection of the fault. In examples in which the middle capacitor has a very small capacitance, there may be very little difference between the magnitudes of the load side current and the bus side current for a load side fault. Thus, increasing the capacitance may make detection easier for the respective controller. However, large capacitors with high capacitances increase the size, mass, and cost of the electrical power system. A capacitance of the middle capacitor may be selected based on the parameters of the electrical power system to allow for relatively easy detection, while conserving size and mass.

An existing controller for an electrical power system may use current waveforms or tripping thresholds for each converter branch. However, setting the current curve for each branch can be challenging because the electrical power system may be bidirectional, where the downstream transmission network may have more or less power transmission capability. For the electrical power system, more distributed generators and loads can be integrated and augmented into the current electrical power system. To this end, a controller may be configured to perform autonomous fault coordination using a solid state power converter with a decoupling capacitor.

In the case of short-circuit fault on the load side, the nearest decoupling capacitor can discharge through the faulty load. Consequently, the fault side device current will raise rapidly to the threshold level for the current to trip the shut-down procedure. The other power converters in healthy branches of the electrical power system will see a relatively lower conduction current value and little impacts from the fault. However, the current waveform for each branch is normally a time-varying variable as more distribution generation units or loads are added to the electrical power system. Therefore, a solid state power converter with a decoupling capacitor can allow for a controller to perform autonomous fault detection using the information on the system-level current curves. The controller may be configured to collect location information to detect faults within the system.

FIG. 1 is a conceptual block diagram illustrating an electrical power system 100 including a solid state power converter 120 and a controller 190, in accordance with one or more techniques of this disclosure. Controller 190 may be configured to activate and deactivate switches 131-134 based on electrical signals received by controller 190 from current sensors inside and outside of solid state power converter 120. Additional example details of the arrangement and operation solid state power converters are described in commonly assigned U.S. Pat. No. 10,693,367, entitled "Pre-Charging Circuit for Power Converter," filed on Feb. 19, 2019, and issued on Jun. 23, 2020, the entire contents of which are incorporated herein by reference.

Electrical power system 100 is configured to deliver electrical power generated by power source 110 to load 170 via solid state power converter 120 and bus 160. Solid state power converter 120 is depicted as including four switches 131-134, although other numbers and arrangements of switches are possible for solid state power converter 120. Switches 131-134 may include insulated-gate bipolar transistors, metal-oxide-semiconductor field-effect transistors (FETs), junction FETs, and/or any other transistor devices. Switches 131-134 may include materials such as GaN and/or SiC and may include antiparallel diodes in some examples. Electrical power system 100 includes load capacitor 172 connected across the rails of bus 160 in parallel with load 170.

FIG. 1 shows just one example of electrical power system 100, and many other examples of electrical power systems may use the techniques described herein. For instance, in some examples, electrical power system 100 may be configured to operate in a reverse direction, where electrical power system 100 includes a power source coupled to bus 160 and a load coupled to switches 131 and 132. In other examples, electrical power system 100 is a bi-directional system where power source 110 or load 170 can operate as a power source and/or an electrical load. For example, power source 110 or load 170 may include a rechargeable battery, a motor-generator, and/or any other element that can operate as a power source or a load. To accommodate bidirectional operation, the electrical lines between power source 110 and switches 131 and 132 may include a bus.

Electrical power system 100 may include a micro-grid, a mixed alternating-current/direct-current (AC/DC) system, an AC/AC system, a DC/DC system, an AC bus, a DC bus, and/or any other type of electrical system. Electrical power system 100 may also be part of a power generation system such as a power plant, a power distribution system, and/or a residential or commercial power system, which may include energy storage and electrical loads. Electrical power system 100 may be a part of an aerospace, marine, or automotive system. The techniques of this disclosure may be especially useful in electrical vehicles, such as for the battery disconnect systems in electrical vehicles. Electrical power system 100 may be part of a vehicle such as any manned or unmanned: air vehicle, land vehicle, marine vehicle, space vehicle, and the like, which may include an engine, a generator, an alternator, and/or a power distribution system.

Power source 110 may be configured to generate electrical power. Power source 110 can include an electric generator that converts mechanical power derived from a shaft, rotor, and/or other mechanical component to electrical power for use by other components or circuits of electrical power system 100. In some examples, the electric generator may also be mounted to a mechanical distribution system and/or a mechanical transmission system (for clarity in the drawings, neither of which is shown). In some examples, electrical power system 100 may include one or more additional power sources, although not shown in FIG. 1. Power source 110 can include an AC generator such as an induction generator or a DC generator that produces DC electricity. Power source 110 may include a wound field machine, a Halbach array generator with permanent magnets on a rotor that is driven by an engine shaft or a propulsor shaft, or any other type of generator.

Power source 110 may, in some examples, generate AC electricity (e.g., multi-phase AC electricity), and electrical power system 100 may include a power converter to generate DC electricity based on the power generated by power source 110. The power converter may be a rectifier circuit that converts AC electricity to DC electricity. Power source 110 may be connected to source-side switches 131 and 132 by electrical lines. These electrical lines may include line inductances 156 and 157 that affect the conduction of electricity along the electrical lines. Embedded inductances 151 and 152 may also affect the conduction of electricity along the electrical lines.

Solid state power converter 120 are connected between power source 110 and load 170. Solid state power converter 120 may include two source-side switches 131 and 132 and two load-side switches 133 and 134. Solid state power converter 120 also includes middle capacitor 140 connected between source-side switches 131 and 132 and load-side switches 133 and 134. A fault may occur on the source side of solid state power converter 120, for example, by occurring on an electrical line between power source 110 and one of switches 131 and 132. A fault may occur on the load side of solid state power converter 120, for example, by occurring on an electrical line between load 170 and one of switches 133 and 134. The fault may occur for many potential reasons, including the breakdown of insulation on an electrical line and/or the failure of a switch or a capacitor.

Bus 160 may operate as a DC bus, where the voltage level on each of the rails is a DC value during normal operation. The target voltage level across bus 160 may be tens or hundreds of volts, such as 28 volts, 270 volts, 540 volts, or 750 volts in some examples. The voltage level across bus 160 may also be lower than or higher than the voltage generated by power source 110. To increase the voltage level across bus 160, controller 190 can control solid state power converter 120 to transfer energy from power source 110 to bus 160.

Load 170 may include a power converter configured to convert the power received from power source 110 to another form of electricity for an electrical load (not shown in FIG. 1). The power converter may produce electrical power in a form that is usable by an electrical load. For example, load 170 may include an inverter configured to convert DC electricity received by load 170 to AC electricity for an electric motor. In some examples, electrical power system 100 can include a load that takes electricity directly from bus 160 without a converter. Load 170 and load capacitor 172 may be connected to load-side switches 133 and 134 by electrical lines. These electrical lines may include line inductances 158 and 159 that affect the conduction of electricity along the electrical lines. Solid state power converter 120 may also include additional embedded inductances 153 and 154 that slow the rise of current during a short-circuit fault.

Load capacitor 172 may be coupled between the rails of bus 160. The power generated by power source 110 that bus 160 receives from solid state power converter 120 can be filtered by load capacitor 172. Load capacitor 172 can act as a low-pass filter for the energy transferred from power source 110 to bus 160. Load capacitor 172 can filter the ripple generated by power source 110 or by load 170 by preventing ripple currents from reaching back to power source 110 and smoothing out variations in the voltage across bus 160.

Controller 190 may be configured to control the operation of solid state power converter 120 and any of the sensors in electrical power system 100. Additionally or alternatively, controller 190 may be configured to control the operation of power source 110 and/or load 170. For example, controller 190 can control the operation of load 170 by delivering control signals to the switches of the converters of load 170. Controller 190 may be configured to control a mode of operation of solid state power converter 120 to deliver power to bus 160 and/or to load 170. Controller 190 may also be able to activate or deactivate power source 110 or otherwise control a mode of operation of power source 110 to deliver different levels and/or types of power.

Controller 190 may include processing circuitry 192, which can include any suitable arrangement of hardware, software, firmware, or any combination thereof, to perform the techniques attributed to controller 190 herein. Examples of processing circuitry 192 include any one or more microprocessors, digital signal processors (DSPs), application specific integrated circuits (ASICs), full authority digital engine control (FADEC) units, engine control units (ECUs), field programmable gate arrays (FPGAs), or any other equivalent integrated or discrete logic circuitry, as well as any combinations of such components. When processing circuitry 192 includes software or firmware, processing circuitry 192 further includes any hardware for storing and executing the software or firmware, such as one or more processors or processing units. In examples in which electrical power system 100 are mounted on a vehicle, controller 190 may be implemented by a FADEC unit.

In general, a processing unit may include one or more microprocessors, DSPs, ASICs, FPGAs, or any other equivalent integrated or discrete logic circuitry, as well as any combinations of such components. Although not shown in FIG. 1, controller 190 may include a memory configured to store data. The memory may include any volatile or non-volatile media, such as a random access memory (RAM), read only memory (ROM), non-volatile RAM (NVRAM), electrically erasable programmable ROM (EEPROM), flash memory, and the like. In some examples, the memory may be external to controller 190 (e.g., may be external to a package in which controller 190 is housed). Processing circuitry 192 may be configured to determine whether a signal is greater than or less than a threshold level. For example, processing circuitry 192 may include circuitry (e.g., digital or analog) and/or instructions for performing thresholding operations.

Controller 190 can deliver control signals to a control terminal of each of switches 131-134 to activate or deactivate each of switches 131-134. Controller 190 may be configured to control solid state power converter 120 based on signals received from sensors to achieve a voltage target or to implement a startup routine or a shutdown routine. By controlling switches 131-134, controller 190 may be able to control the charging and discharging of capacitors 140 and 172 and bus 160.

For example, by controlling switches 131-134, controller 190 may connect power source 110 and middle capacitor 140 to charge middle capacitor 140. Controller 190 can activate switches 131 and 132 and deactivate switches 133 and 134 to connect middle capacitor 140 to power source 110 and concurrently isolate middle capacitor 140 from bus 160 and load 170. Controller 190 can deactivate switches 131 and 132 and activate switches 133 and 134 to connect middle capacitor 140 to bus 160 and load 170 and concurrently isolate middle capacitor 140 from power source 110. Therefore, middle capacitor 140 can help decouple the charging of load capacitor 172 and also help decouple a downstream network fault (e.g., occurring at the load side) from an upstream network (e.g., the source side). Middle capacitor 140 can also delay the current rise on the source side of electrical power system 100 in response to a load side fault and delay the current rise on the load side of electrical power system 100 in response to a source side fault. Although described as a "middle" capacitor, middle capacitor 140 is not necessarily positioned at the center of solid state power converter 120.

In some examples, middle capacitor 140 may include an array of switchable capacitors connected in parallel. Controller 190 may be configured to trim or adjust the capacitance of middle capacitor 140 by connecting or disconnecting capacitors of the array. For example, to increase the capacitance of middle capacitor 140, controller 190 can activate one or more transistors to connect additional capacitors of the array, where each transistor may be connected in series with one of the capacitors of the array. Likewise, to reduce the capacitance of middle capacitor 140, controller 190 can deactivate switches to connect additional capacitors of the array.

To activate one of switches 131-134, controller 190 can deliver an enabling control signal to the control terminal of the respective switch. Responsive to receiving the enabling control signal, the respective switch may close and allow current to flow across the switch (e.g., between the load terminals of the switch). The enabling control signal, along with a voltage difference across the respective switch, may cause or facilitate the flow of electricity across the respective switch. To deactivate one of switches 131-134, controller 190 can deliver a disabling control signal to the control terminal of the respective switch. Responsive to receiving the disabling control signal, the respective switch may open and prevent current from flowing across the switch.

Figure 2:
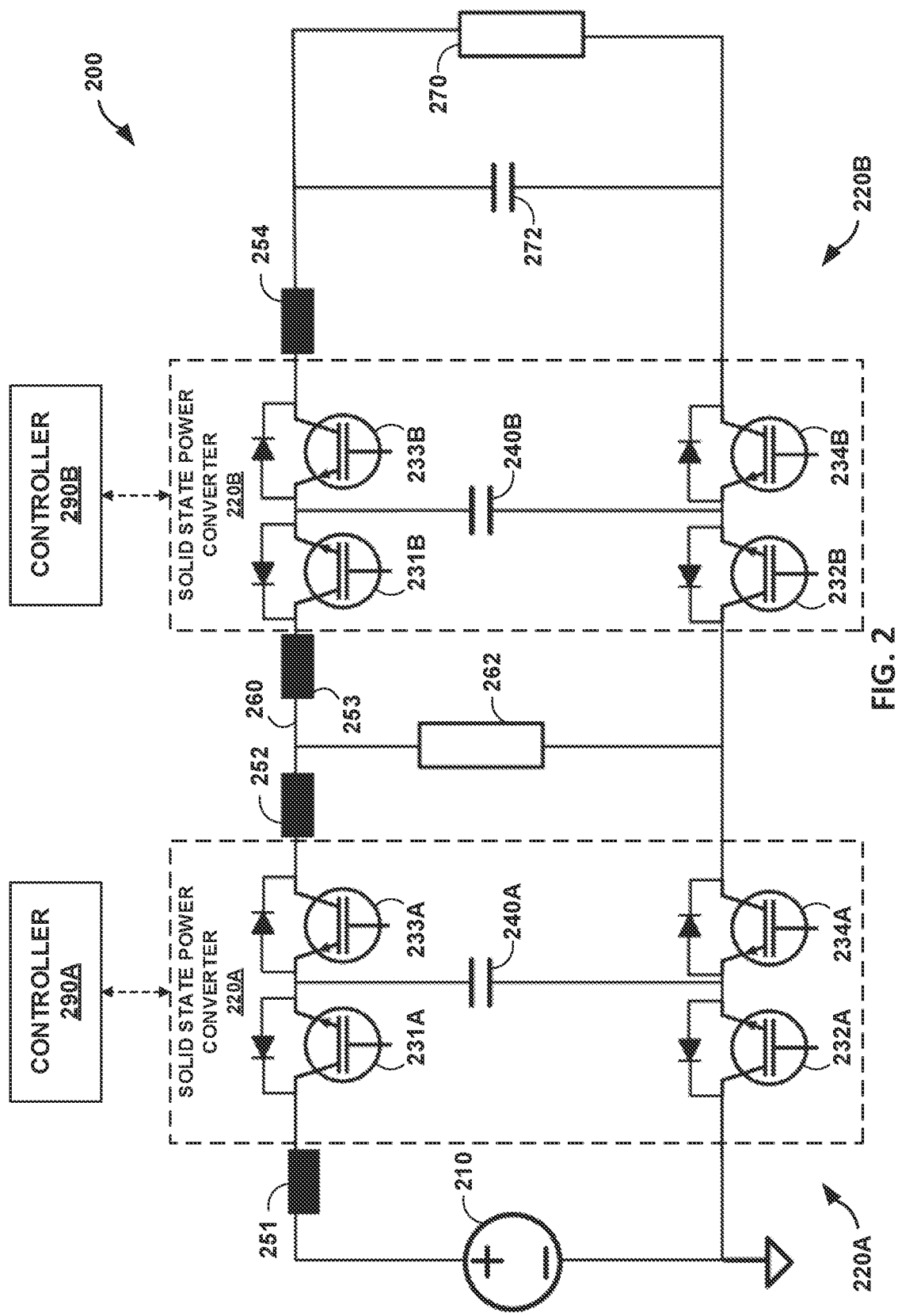
FIG. 2 is a conceptual block diagram illustrating an electrical power system including a bus connected between two solid state power converters, in accordance with one or more techniques of this disclosure.

FIG. 2 is a conceptual block diagram illustrating an electrical power system 200 including a bus 260 connected between two solid state power converters 220A and 220B, in accordance with one or more techniques of this disclosure. Controllers 290A and 290B may be configured to activate and deactivate switches 231A-234A and 231B-234B based on electrical signals received by controller 290 from current sensors and/or any other sensors. Other voltage sensors that transmit signals to controllers 290A and 290B include voltage sensors for sensing the collector-emitter voltages or drain-source voltages of switches 231A-234A and 231B-234B. The signals received by controllers 290A and 290B from the current sensors may indicate the current through a respective one of switches 231A, 233A, 231B, and 233B.

Electrical power system 200 is configured to deliver electrical power generated by power source 210 to bus 260 via solid state power converter 220A. Electrical power system is also configured to deliver electrical power from bus 260 to load 270 via solid state power converter 220B. In some examples, electrical power system 200 is a bi-directional system where power source 210 or load 270 can operate as a power source and/or an electrical load. For example, power source 210 or load 270 may include a rechargeable battery, a motor-generator, and/or any other element that can operate as a power source or a load. As shown in FIG. 2, electrical power system 200 includes one power source and one load, but in some examples electrical power system 200 may also include one or more additional power sources and/or one or more additional loads.

Each of solid state power converters 220A and 220B may include inductances 251-254, which may include transmission line inductances that affect the conduction of electricity along the electrical lines of electrical power system 200. Inductances 251-254 may be discrete inductances and/or may represent the parasitic inductances of electrical power system 200. Each of inductances 251-254 may resist a change in current through an electrical line. Thus, the characteristics of inductances 251-254 may affect how quickly the current sensed by each of the sensors reaches a threshold level for a current during or after the occurrence of fault, where controller 290 may use the threshold level to detect the occurrence of a fault and the location of the fault. Inductances 251-254 may be employed to limit the increase in current during a short-circuit fault.

A fault that occurs on the load side of solid state power converter 220B, for example, may draw current from middle capacitor 240B through switch 233B and inductance 254. As middle capacitor 240B discharges, middle capacitor 240B may draw current from bus 260 through switch 231B and inductance 253. The load side fault may first cause a change in current at a load-side sensor and eventually cause changes in the currents at other sensors. Likewise, a fault that occurs on the source side of solid state power converter 220A, for example, may draw current from middle capacitor 240A through switch 231A and inductance 251. The source side fault may first cause a change in current at a source-side sensor and eventually cause changes in the currents at the other sensors.

The load side of electrical power system 200 may include switches 233B and 234B, inductance 254, load 270, and load capacitor 272. The source side of electrical power system 200 may include switches 231A and 232A, inductance 251, and power source 210. The source side can be referred to as upstream, and the load side can be referred to as downstream. The bus side of electrical power system 200 may include switches 233A, 234A, 231B, 232B, inductance 252 and 253, and resistance 262.

Micro-grid power distribution is critical technology for the aerospace and marine industries, among others. Solid state power converters can provide power control and protection in a micro-grid power system. A controller for a solid state power converter may be able to detect a fault in the system based on a current rating or high-speed communication between converters. The current and power ratings of a solid state power converter may be predetermined or fixed values for a power transmission network. The current rating may be expressed as an exponent of the current (e.g., a square) multiple by time, which can represent the fault severity. The current rating may be used for grading the protection devices in an electrical power system.

However, more distributed power sources and loads may be added to an electrical power system during the lifetime of the system. Adding multiple power sources increases the complexity of the system. For example, depending on the arrangement of the system, the downstream-rated current may be even larger than the upstream-rated current in a bidirectional power flow network.

In accordance with various aspects of the techniques of this disclosure, controller 290A or 290B may be configured to use locally sensed information to detect a fault, which can allow for fast processing times by removing network and central processing delays. For example, controller 290B may be configured to determine that a fault has occurred in electrical power system 200 based on magnitudes of the signals received from sensors in solid state power converter 220B. The techniques of this disclosure may eliminate the need for a common controller in electrical power system 200 for controlling both of solid state power converters 220A and 220B. In some examples, solid state power converters 220A and 220B may be distributed and separated along the long cable of bus 260 such that the current measurements from solid state power converter 220A may not be available to controller 290B.

Controllers 290A and 290B may include processing circuitry configured to determine on which side or portion of electrical power system 200 a fault has occurred in response to determining that the magnitude of a signal from one side of electrical power system 200 is greater than a threshold level but the magnitude of a signal from the other side of the electrical power system 200 is not greater than the threshold level. In this way, controllers 290A and 290B may perform various aspects of the techniques to detect a fault in electrical power system 200.

To this end, controllers 290A and 290B may be able to protect electrical power system 200 by isolating the positive and negative buses of bus 260 or other electrical lines independently in case of short circuit or ground fault. Controllers 290A and 290B may be configured to perform autonomous fault detection/protection coordination of upstream and downstream short fault while preventing false tripping due to transients caused by load changes and other non-fault events. In addition, middle capacitors 240A and 240B allow for line-isolated charging of load capacitor 272. The capacitance of middle capacitors 240A and 240B may be selected during a design process based on the characteristics of electrical power system to aid in autonomous fault detection.

Controllers 290A and 290B may be configured to perform autonomous fault detection with unidirectional or bidirectional solid state power converters. For example, controllers 290A and 290B may be configured to perform bidirectional control of the current flow between power source 210 and load 270 which also supports power transfer and protection capability to various fault conditions. In each positive rail and negative rail of solid state power converter 220A or 220B, the two switching devices with antiparallel diodes are connected in common emitter configuration.

The techniques of this disclosure can be used alone or in any combination to provide redundancy and cross-checking for detecting and locating a fault. The techniques of this disclosure may also be used in combination with existing methods for additional redundancy and cross-checking. Additionally or alternatively, controllers 290A and 290B may be configured to use fail-safe deactivation techniques to limit the exposure of electrical power system 200 to a fault.

Figure 3:
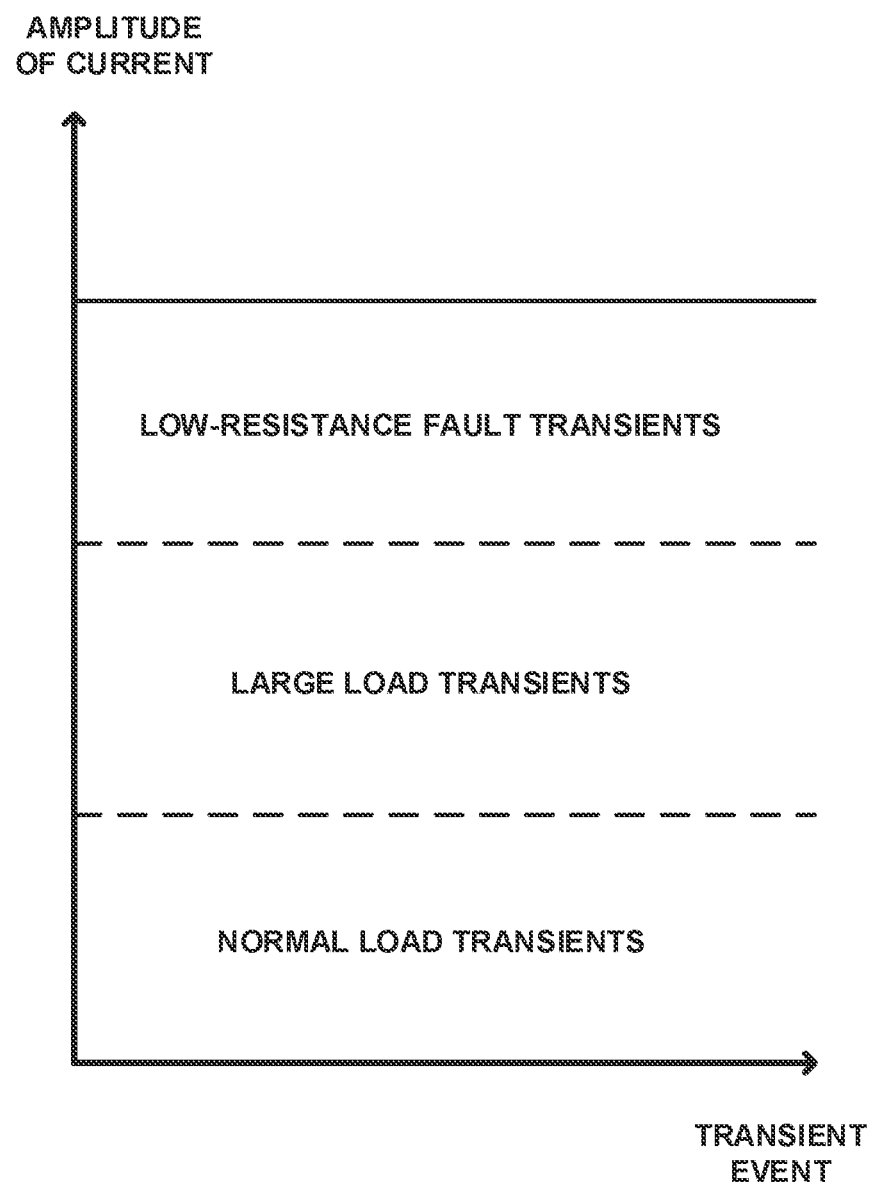
FIG. 3 illustrates the amplitude of electrical current associated with events that can occur in an electrical power system, in accordance with one or more techniques of this disclosure.

FIG. 3 illustrates the amplitude of electrical current associated with events that can occur in an electrical power system, in accordance with one or more techniques of this disclosure. According to FIG. 3, normal load transients create the lowest magnitude of current increases. Examples of normal load events include increased power consumption due to normal operation and an increase in speed of motor load.

Large load transients can create higher magnitudes of current increases in an electrical power system. Large load transients may be caused by the startup or reconnection of a load which may cause a transient inrushing current. But the large load transients should not trigger the tripping signal for those switches. Low-resistance fault transients are capable of creating the highest magnitude increases in current in an electrical power system. Example low-resistance faults include short-circuit faults and ground faults, such as short circuits to ground or to the high-side power supply.

Figure 4:
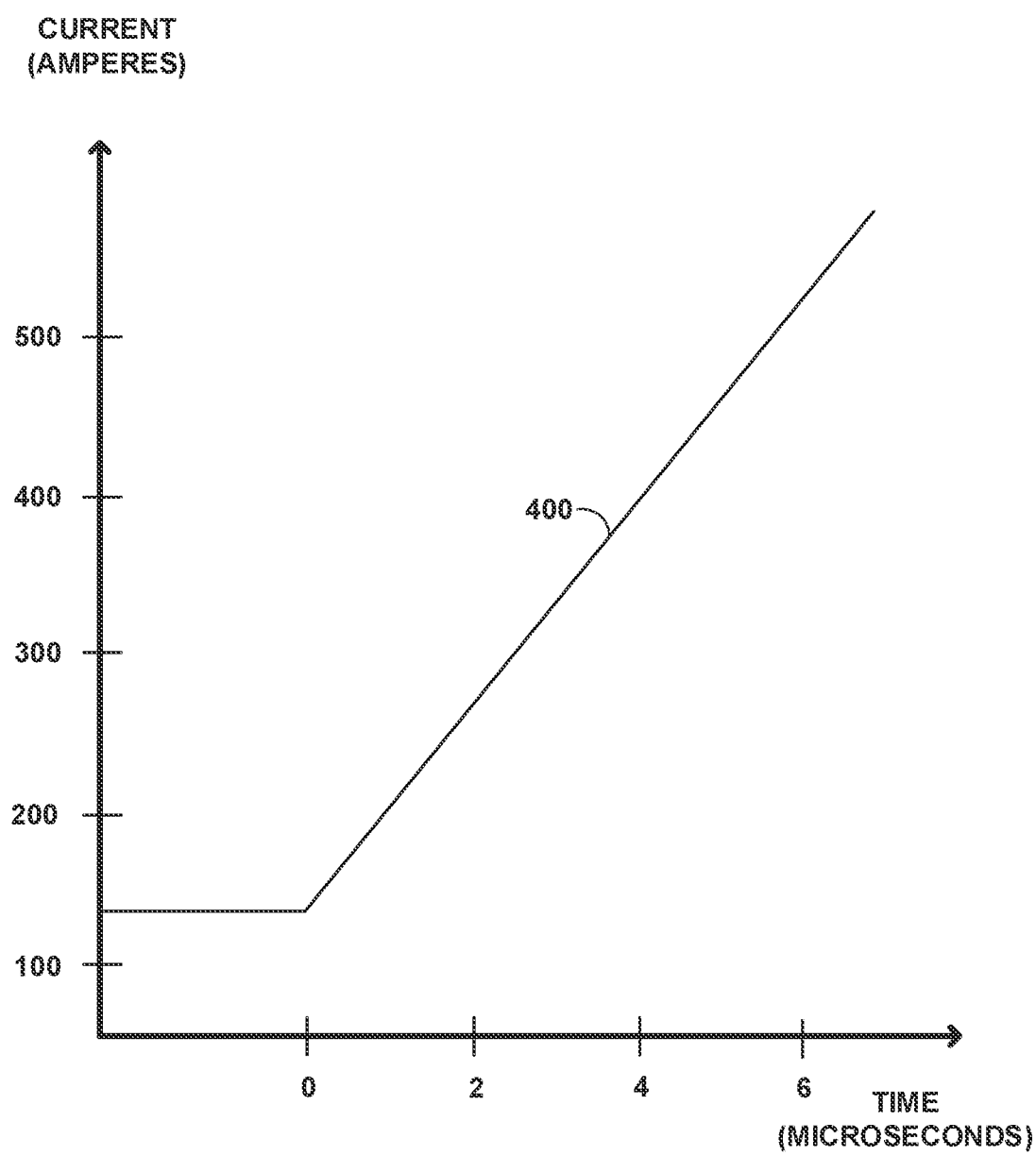
FIG. 4 is a plot of a current through a solid state power converter without a middle capacitor before and after a fault, in accordance with one or more techniques of this disclosure.
Figure 5:
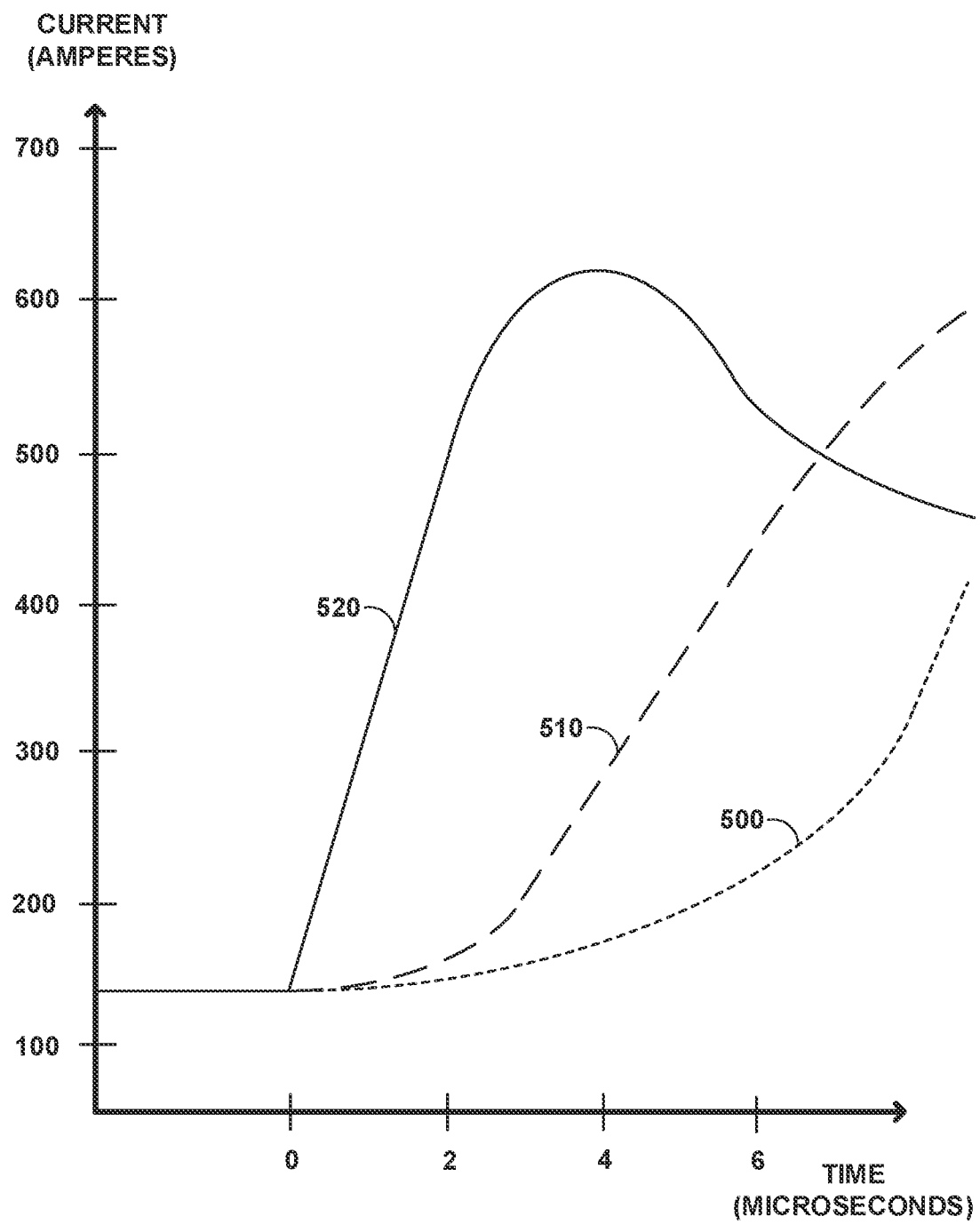
FIG. 5 is a plot of currents through the source side, the bus side, and the load side of an electrical power system before and after a fault, in accordance with one or more techniques of this disclosure.

FIG. 4 is a plot of a current 400 through a solid state power converter without a middle capacitor before and after a fault, in accordance with one or more techniques of this disclosure. Before the occurrence of the fault at time zero, current 400 is approximately 140 amperes. When the fault occurs at time zero, current 400 increases rapidly from 140 amperes. Current 400 can represent the current sensed at both sides of a solid state power converter without a middle capacitor because the current should be equal at both sides in examples in which no middle capacitor is connected. FIGS. 4 and 5 show example current waveforms for Cases 1 and 2 in Table I below.

TABLE I

Example parameters for electrical power system 200

| Case | Inductances 253 and 254 | Mid cap 240B | $I_{threshold}$ | Comments |
|---|---|---|---|---|
| 1 | 5 µH | not available | 580 A | No autonomous fault coordination |
| 2 | 5 µH | 1 µF | 580 A | Correct fault coordination |
| 3 | 10 µH | 1 µF | 580 A | False fault coordination |
| 4 | 10 µH | 2 µF | 580 A | Correct fault coordination |

FIG. 5 is a plot of currents 500, 510, 520 through the source side, the bus side, and the load side of an electrical power system before and after a fault, in accordance with one or more techniques of this disclosure. The example waveforms shown in FIG. 5 are sensed in an electrical power system that includes a middle capacitor in a solid state power converter. Before the occurrence of the fault at time zero, currents 500, 510, and 520 are all approximately 140 amperes. When the fault occurs at time zero, current 500 increases more slowly than currents 510 and 520.

Using electrical power system 200 shown in FIG. 2 as an example, the fault may occur on the load side of electrical power system 200. For example, the fault may occur at load 270 or across load capacitor 272. Current 500 represents the source side current of solid state power converter 220A shown in FIG. 2. Current 510 represents the bus current at bus 260, and current 520 represents the load side current of solid state power converter 220B. Because current 520 is closest to the occurrence of the fault, current 520 increases most quickly after the occurrence of the fault.

In the example shown in FIG. 5, currents 500 and 520 rise at different rates due to the fault. Controllers 290A and 290B may be configured to implement a threshold level of 580 amperes for currents 500, 510, and 520. Current 520 rises rapidly to the threshold level of 580 amperes to trip switches 233B and 234B, while current 500 remains at a relatively low value (e.g., 250 amperes) with lesser impacts for switches 231A-234A. Switches 233B and 234B may be tripped when controller 290B deactivates switches 233B and 234B in response to a threshold level being exceeded.

Controller 290B may be configured to determine that a fault has occurred on the load side of electrical power system 200 by at least determining that a magnitude of the signal received from sensor in or near solid state power converter 220B (e.g., waveform 520) is greater than a first threshold level. In addition, controller 290B may be configured to determine that the fault occurred by at least determining that a magnitude of the signal received from one or more sensors is not greater than a second threshold level. The first and second threshold levels may be the same or different levels.

In response to determining that a fault occurred on the load side of electrical power system 200, controller 290B may be configured to deactivate switches 233B and 234B to isolate power source 210 and bus 260 from the fault. In some examples, controller 290B may be configured to first deactivate switches 231B and 232B to allow middle capacitor 240 to discharge to the load side of electrical power system 200 before deactivating switches 233B and 234B. Controller 290B may be configured to deactivate switches 233B and 234B in response to determining that the voltage across middle capacitor 240 is sufficiently low (e.g., less than a threshold level).

In examples in which controller 290B deactivates switches 233B and 234B in response to determining that a fault occurred on the load side, controller 290B may be configured to subsequently determine whether switches 233B and 234B are actually deactivated. Switch 233B or 234B may not actually be deactivated because of a short circuit across the load path of switch 233B or 234B, a failure in the gate driver for switch 233B or 234B, and/or a disconnection between the gate driver and switch 233B or 234B. Controller 290B may be configured to determine whether switches 233B or 234B are actually deactivated by measuring the current through or the voltage across switches 233B or 234B. Controller 290A can also determine whether the current through solid state power converter 220A is greater than a threshold level based on signal(s) received by controller 290A from current sensors in or near solid state power converter 220A.

In response to determining that one or both of switches 233B and 234B are still active and determining that the current through solid state power converter 220B is greater than a threshold level, controller 290B can deactivate bus-side switches 231B and 232B. Deactivating bus-side switches 231B and 232B further isolates the fault from power source 210 in examples in which load-side switches 233B and 234B are still allowing current to flow through electrical power system 200. Thus, controller 290B may be configured to implement fail-safe techniques in examples in which switches 233B and 234B cannot deactivate.

Additionally or alternatively, controller 290A may be configured to determine that a fault has occurred on the source side of electrical power system 200 by at least determining that a magnitude of the signal received from a source-side sensor (e.g., waveform 500) is greater than a first threshold level. In addition, controller 290A may be configured to determine that the source-side fault occurred by at least determining that a magnitude of the signal received from a bus-side sensor is not greater than a second threshold level. The first and second threshold levels may be the same or different levels.

Figure 6:
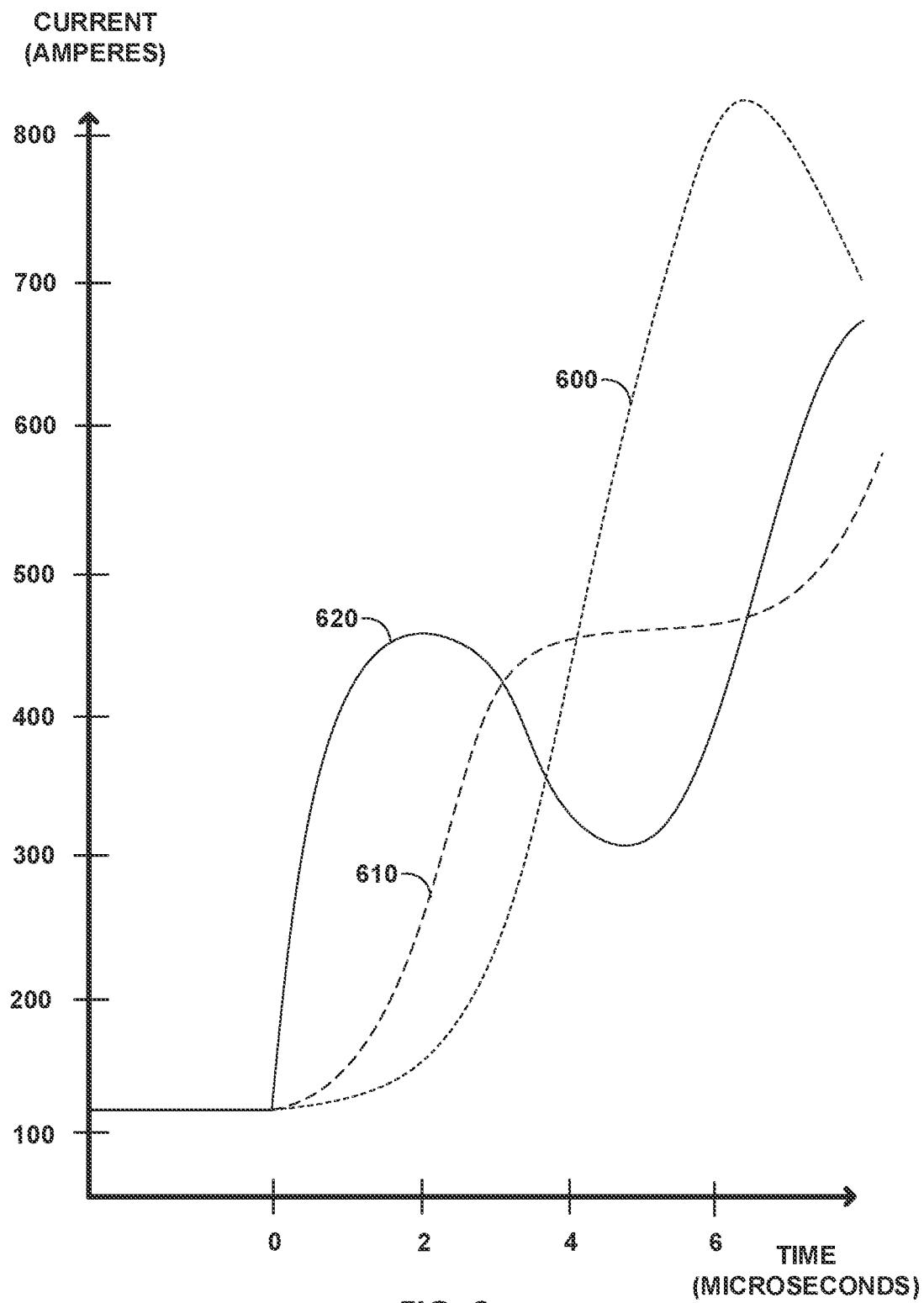
FIGS. 6 and 7 are plots of currents through an electrical power system with differing capacitance values for middle capacitors before and after a fault, in accordance with one or more techniques of this disclosure.
Figure 7:
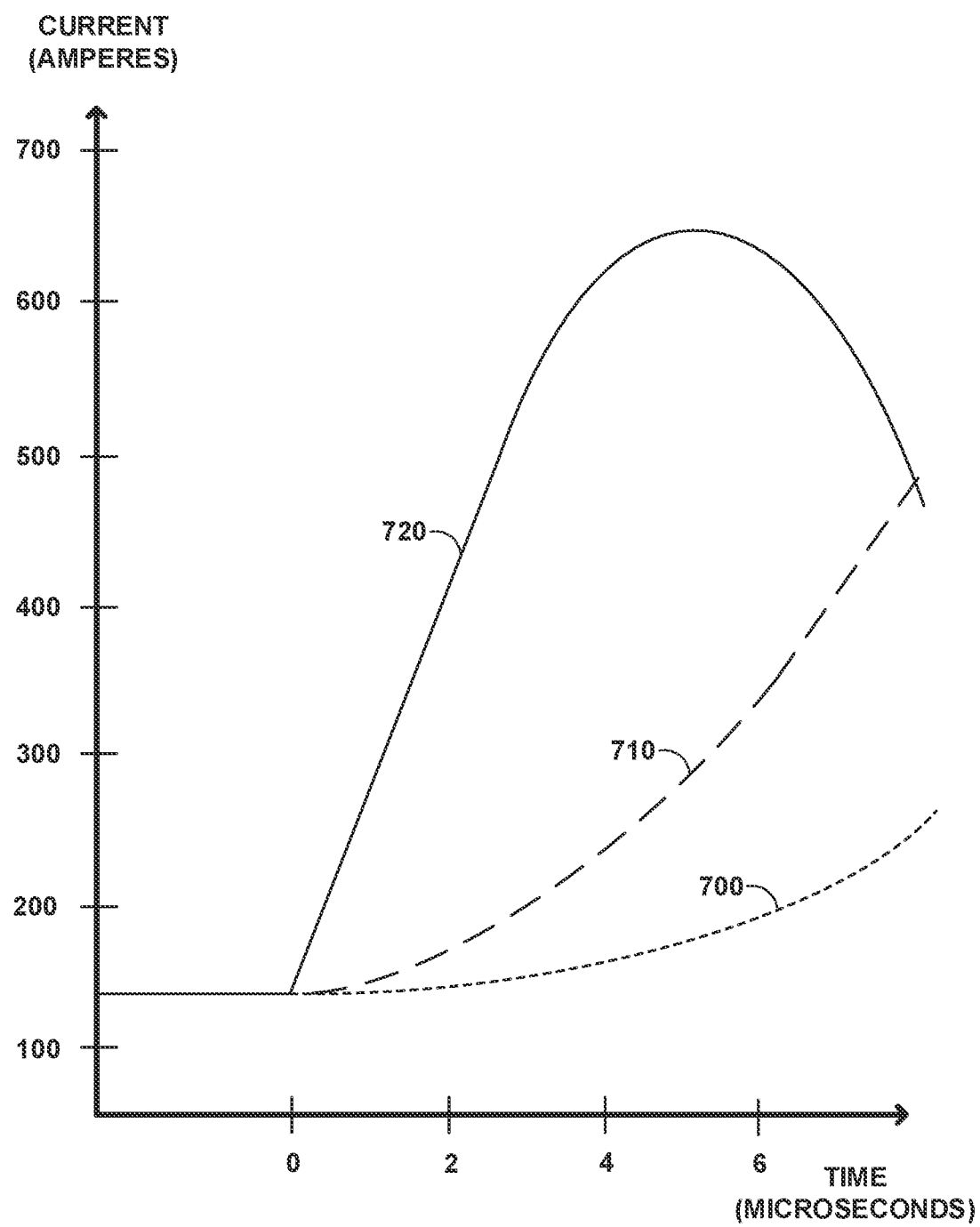

FIGS. 6 and 7 are plots of currents 600, 610, and 620 through an electrical power system with differing capacitance values for middle capacitors before and after a fault, in accordance with one or more techniques of this disclosure. In the example shown in FIG. 6, current 620 does not reach the threshold level of 580 amperes before current 600 reaches the threshold level. The waveforms of currents 600, 610, and 620 are based on inductances 251-254 and the capacitances of middle capacitors 240A and 240B. For example, the different waveforms in FIGS. 5 and 6 may be due to an increase in each of transmission line inductances 251-254 from five microhenries to ten microhenries, even if the other parameters remain the same in both examples.

The other parameters of electrical power system 200 shown in Table I may include the capacitances of middle capacitors 240A and 240B, the voltage generated by power source 210, and the threshold level for detecting a fault. The voltage generated by power source 210 may be a battery voltage or the output of a power converter such as a rectifier or a DC/DC converter. The threshold level may be set based on the damage that can occur to the components in electrical power system 200 at various current levels.

In the example of FIG. 6 (Case 3 in Table I), the capacitance of middle capacitor 240B may have been incorrectly sized and selected given the threshold current level of 580 amperes. Controller 290A may be configured to generate a false alarm on the source side of electrical power system 200 because current 600 reaches the threshold level of 580 amperes before currents 610 and 620 reach the threshold level, even though the fault occurred on the load side. Thus, using a threshold level of 580 amperes for the waveforms shown in FIG. 6 would result in an incorrect detection of the load side fault as a source side fault.

An existing electrical power system experiencing the current waveforms shown in FIG. 6 would use a threshold level that is tailored to the current waveform to improve fault detection, rather than sizing a middle capacitor to improve fault detection. The techniques described herein allow for setting the threshold level based on damage that can occur to components within the system and then selecting the capacitance of the middle capacitor to allow for effective fault detection. The selection of the capacitance of the middle capacitor can be based on the already-determined threshold level.

In the example shown in FIG. 7, current 720 reaches the threshold level of 580 amperes before currents 700 and 710 because the capacitance of middle capacitor 240B is appropriately sized. As shown in Table I, the capacitance of middle capacitor 240B has been increased from one microfarad to two microfarads, which allows middle capacitor 240B to source more current to the fault on the load side of electrical power system 200.

Figure 8A:
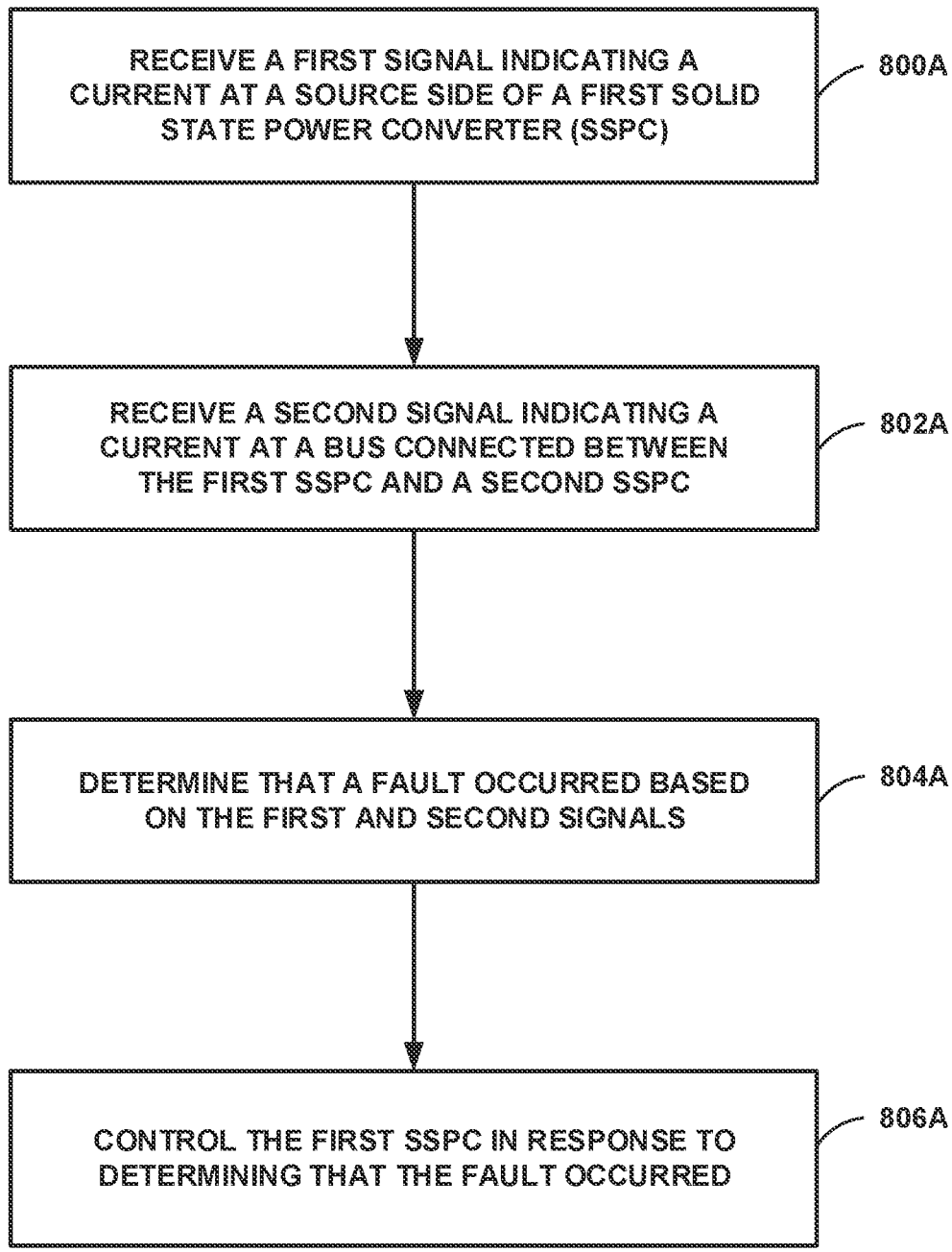
FIGS. 8A, 8B, and 9 are flowcharts illustrating example processes for detecting a fault, in accordance with one or more techniques of this disclosure.
Figure 8B:
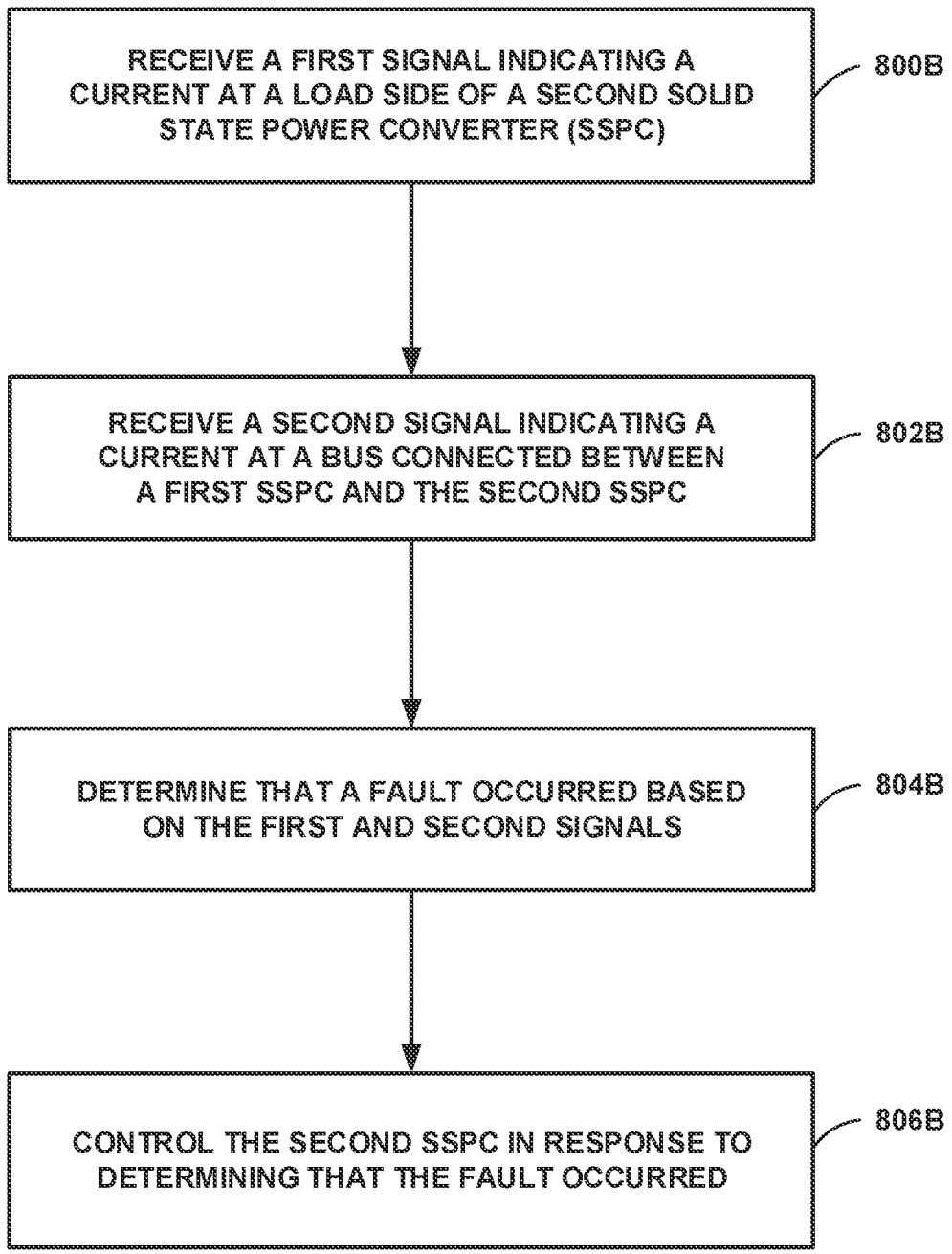
Figure 9:
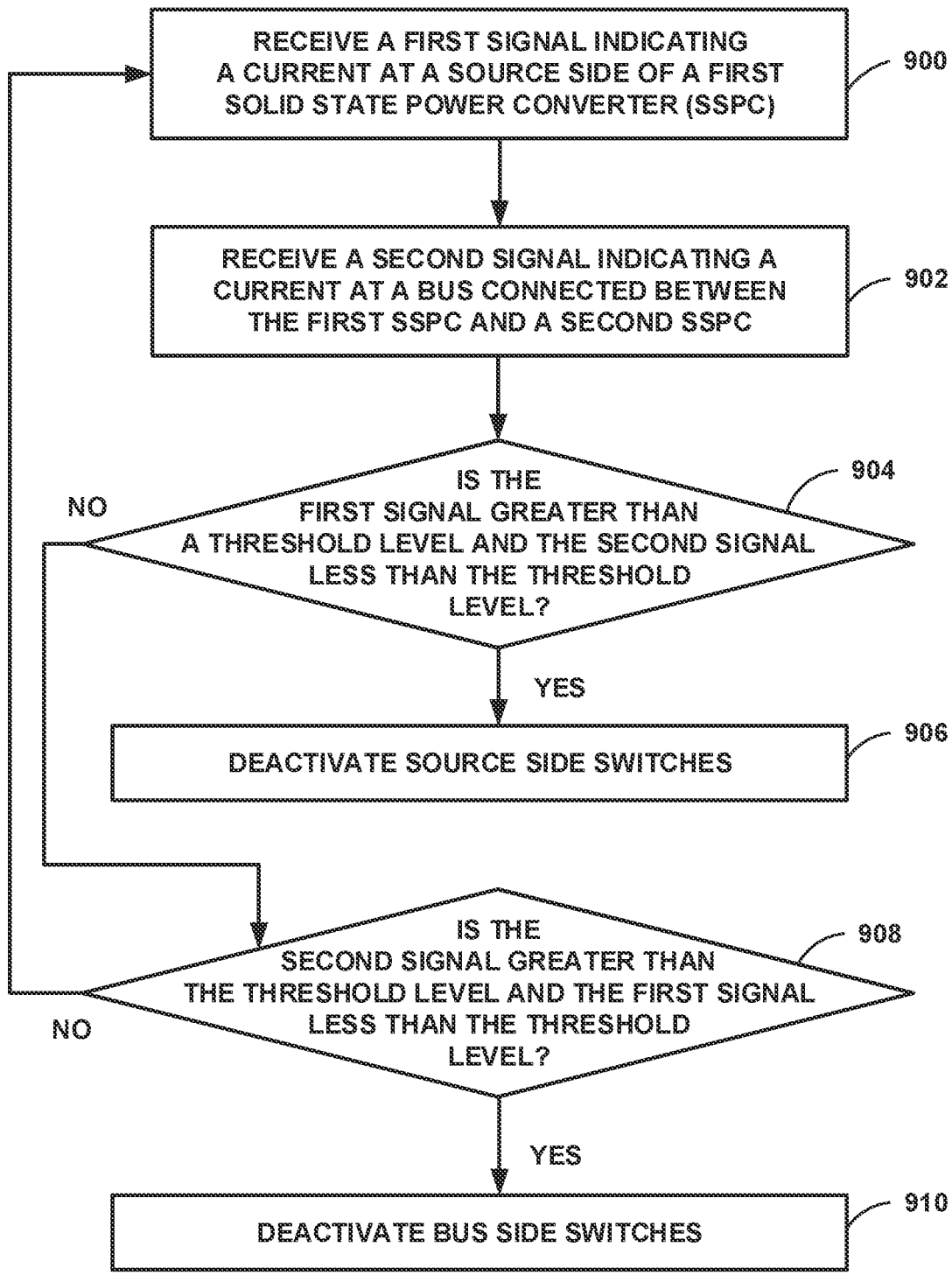

FIGS. 8A, 8B, and 9 are flowcharts illustrating example processes for detecting a fault, in accordance with one or more techniques of this disclosure. The techniques of FIGS. 8A, 8B, and 9 are described with reference to controller 290A shown in FIG. 2, but the techniques of FIGS. 8A, 8B, and 9 may be also performed by controller 290B shown in FIG. 2 or controller 190 shown in FIG. 1. Controllers 190, 290A, and 290B may be configured to perform any of operations 800A through 806A and 800B through 806B shown in FIGS. 8A and 8B, any of operations 900 through 912 shown in FIG. 9, or any and all other techniques described with respect to FIGS. 8A, 8B, and 9.

In the example of FIG. 8A, controller 290A receives a first signal from a source-side sensor indicating a current at a source side of solid state power converter 220A (800A). In addition, controller 290A receives a second signal from a bus-side sensor indicating a current at bus 260 (802A). Each of the first and second signals may indicate a voltage across a shunt resistor, the output of a current mirror, the output of Hall sensor, and/or the output of a magnetoresistive sensor.

In the example of FIG. 8A, controller 290A determines that a fault occurred in electrical power system 200 based on the first and second signals (804A). For example, controller 290A may be configured to detect a fault by at least determining that a magnitude of one or more of the first and second signals is greater than a threshold level. Controller 290A may use the same or different threshold levels for each of the first and second signals. For example, controller 290A may be configured to determine the location of a fault by at least determining that the magnitude of one signal is greater than a first threshold level and the magnitude of another signal is less than a second threshold level, where the second threshold level is lower than the first threshold level. In examples in which the magnitude of one signal is much higher than the magnitude of another signal, controller 290A may be able to confirm the location of a fault. For example, at the time that current 620 reaches the threshold level of 580 amperes in FIG. 6, currents 600 and 610 are several hundred amperes lower than the threshold level, indicating that the fault occurred on the load side of electrical power system 200.

In the example of FIG. 8A, controller 290A controls solid state power converter 220A in response to determining that the fault occurred (806A). Controller 290A may be configured to deactivate one or more switches of solid state power converter 220A in response to determining that the fault occurred. In examples in which controller 290A determines that the fault occurred on a source side of electrical power system 200, controller 290A may be configured to deactivate switches 231A and 232A to isolate bus 260 from the fault.

In the example of FIG. 8B, controller 290B receives a first signal from a load-side sensor indicating a current at a load side of solid state power converter 220B (800B). In addition, controller 290B receives a second signal from a bus-side sensor indicating a current at bus 260 (802B). Controller 290B determines that a fault occurred in electrical power system 200 based on the first and second signals (804B). For example, controller 290B may be configured to detect a fault by at least determining that a magnitude of one or more of the first and second signals is greater than a threshold level. Controller 290B may use the same or different threshold levels for each of the first and second signals.

In the example of FIG. 8B, controller 290B controls solid state power converter 220B in response to determining that the fault occurred (806B). Controller 290B may be configured to deactivate one or more switches of solid state power converter 220B in response to determining that the fault occurred. In examples in which controller 290B determines that the fault occurred on a load side of electrical power system 200, controller 290B may be configured to deactivate switches 233B and 234B to isolate bus 260 from the fault.

In the example of FIG. 9, controller 290A receives the first and second signals from current sensors in or near solid state power converter 220A(900, 902). Controller 290A then determines whether the first signal is greater than a threshold level and whether the second signal is less than the threshold level (904). In response to making this determination, controller 290A deactivates source-side switches 231A and 232A to isolate the fault on the source side of solid state power converter 220A (906). Additionally or alternatively, in response to making this determination, controller 290A may deactivate switches 233A and 234A.

In response to determining that the condition of step 904 is not satisfied, controller 290A determines whether the second signal is greater than a threshold level and whether the first signal is less than the threshold level (908). In response to making this determination, controller 290A deactivates bus-side switches 233A and 234A to isolate the fault on the load side of solid state power converter 220A (910). Additionally or alternatively, in response to making this determination, controller 290A may deactivate switches 231A and 232A.

Figure 10:
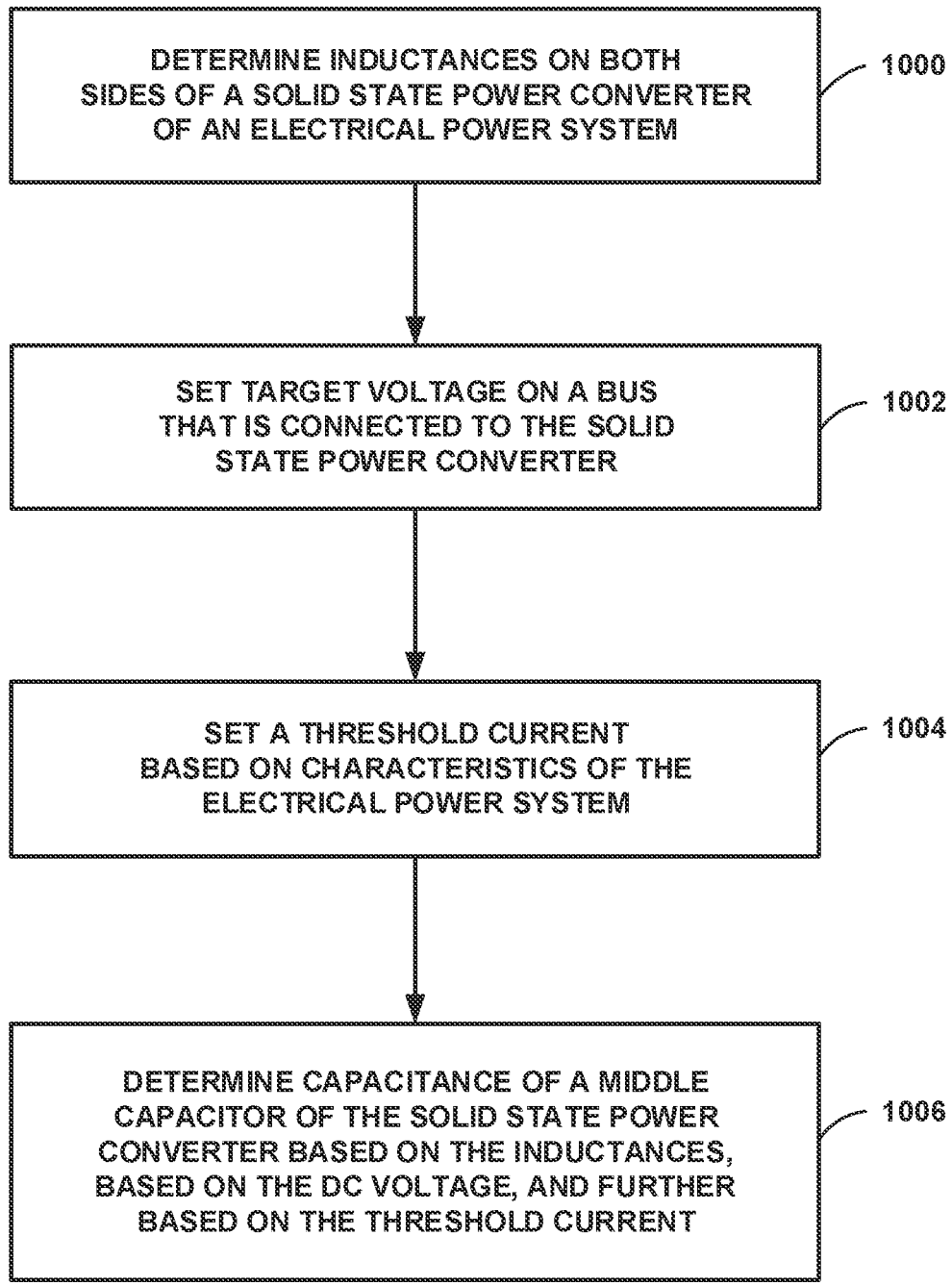
FIG. 10 is a flowchart illustrating an example process for selecting a capacitance of a middle capacitor, in accordance with one or more techniques of this disclosure.

FIG. 10 is a flowchart illustrating an example process for selecting a capacitance of a middle capacitor, in accordance with one or more techniques of this disclosure. The techniques of FIG. 10 are described with reference to middle capacitor 140 shown in FIG. 1, but the techniques of FIG. 10 may be performed for middle capacitors 240A and/or 240B shown in FIG. 2.

In the example of FIG. 10, inductances 251-254 are determined on both sides of solid state power converters 220A and 220B (1000). The transmission line inductances 251-254 can be determined by monitoring the change in current over time in response to a change in voltage. The voltage level generated by power source 210, or the voltage level outputted by a converter connected to power source 210, can also be determined (1002). The threshold level for current throughout electrical power system 200 can be set based on the characteristics of electrical power system 200 (1004). For example, the insulation on an electrical line may burn away or one of switches 231A-234A and 231B-234B may break down above a particular current level. A capacitance of middle capacitor 240A or 240B can be determined based on inductances 251-254, the voltage level outputted by power source 210, and based on the threshold level for current.

Equations (1)-(18) provide an example basis for determining a capacitance of middle capacitor 240A or 240B. Equations (1)-(7) provide the mathematical relationships between inductances 251-254 and the currents and voltages through electrical power system 200. The voltage across an inductance is proportional to the change in current through the inductor.

$$L_{251}\frac{di_{251}}{dt} = V_{210} - V_{240A} \tag{1}$$

$$i_{251} = i_{252} + C_{240A}\frac{dV_{240A}}{dt} \tag{2}$$

$$L_{252}\frac{di_{252}}{dt} = V_{240A} - V_{260} \tag{3}$$

$$i_{252} = i_{253} + \frac{V_{260}}{R_{262}} \tag{4}$$

$$L_{253}\frac{di_{253}}{dt} = V_{260} - V_{240B} \tag{5}$$

$$i_{253} = i_{254} + C_{240B}\frac{dV_{240B}}{dt} \tag{6}$$

$$L_{254}\frac{di_{254}}{dt} = V_{240B} - V_{272} \tag{7}$$

Assuming normal operation of electrical power system 200 as the initial condition, a short-circuit fault on the downstream (e.g., load side of electrical power system 200) can force the voltage across load capacitor 272 to zero volts. A few microseconds after the downstream short-circuit fault, the magnitude of the direct current in inductances 251-254 will start to rise. However the current sensed by a load-side sensor is different from the current sensed by a bus-side sensor due to the LCR resonant circuit that includes inductances 251-254, middle capacitors 240A and 240B, and resistance 262. The different rates of increase for the current can provide an indication of the location of the fault (e.g., on the downstream, load side), and controller 290B can deactivate switches 233B and 234B immediately without affecting the upstream load power supply because switches 231A-234A, 231B, and 232B to remain in normal operation. Thus, controller 290 may be able to clear the downstream load circuit fault immediately without affecting the upstream resistance 262 too much. Therefore, the voltage across resistance 262 is assumed to be the same as normal operation conditions. Based on previously mentioned assumptions, the following circuit equations (8) and (9) are derived. Table II provides some of the simulation parameters for an example electrical power system.

TABLE II

Simulation parameters for electrical power system 200

$$L_{254}\frac{di_{254}}{dt} = V_{240B} \quad (8)$$

$$L_{253}\frac{di_{253}}{dt} = V_{210} - V_{240B} \quad (9)$$

| Parameter | Example value |
|---|---|
| $V_{240B}$ | 270 volts |
| $L_{251}$ to $L_{254}$ | to be varied ($L_{253} = L_{254}$) |
| $C_{240A}$ | 1 microfarad |
| $C_{240B}$ | to be optimized with respect to $L_{251}$ to $L_{254}$ |
| $C_{272}$ | 500 microfarads |
| $R_{262}$ | 100 ohms |
| $R_{270}$ | 7.7 ohms |

Combining Equations (6), (8), and (9) provides Equations (10) and (11).

$$L_{253}C_{240B}\frac{d^2V_{240B}}{dt^2} + \left(1+\frac{L_{253}}{L_{254}}\right)V_{240B} = V_{210} \quad (10)$$

$$V_{240B} = \frac{V_{210}}{2} + \frac{V_{210}}{2}\sin\left(t\times\sqrt{\frac{1+\frac{L_{253}}{L_{254}}}{L_{253}C_{240B}}} + \frac{\pi}{2}\right) \quad (11)$$

Equations (12) and (13) provide analytical equations for the currents through electrical power system 200.

$$i_{253} = \quad (12)$$
$$\frac{V_{210}}{2L_{253}}t + \frac{V_{210}}{2L_{253}}\sqrt{\frac{L_{253}C_{240B}}{1+\frac{L_{253}}{L_{254}}}}\cos\left(t\times\sqrt{\frac{1+\frac{L_{253}}{L_{254}}}{L_{253}C_{240B}}} + \frac{\pi}{2}\right)$$

$$i_{254} = \quad (13)$$
$$\frac{V_{210}}{2L_{253}}t - \frac{V_{210}}{2L_{253}}\sqrt{\frac{L_{253}C_{240B}}{1+\frac{L_{253}}{L_{254}}}}\cos\left(t\times\sqrt{\frac{1+\frac{L_{253}}{L_{254}}}{L_{253}C_{240B}}} + \frac{\pi}{2}\right)$$

A short circuit fault that occurs on the load side should trigger at time $t_{react}$ when the current sensed by sensor 244 hits the threshold value $I_{threshold}$ while the current sensed by sensor 243 still remains at a relatively low value. In response to detecting the load side fault, controller 290 will deactivate only switches 233B and 234B while other switches 231A-234A, 231B, and 232B remain unaffected. In this way, the downstream short-circuit fault is detected and isolated by controller 290. The optimal $t_{react}$ is selected using Equation (14) when Equations (15) and (16) are valid.

$$t_{react} = \frac{\pi}{2}\sqrt{\frac{L_{253}C_{240B}}{1+\frac{L_{253}}{L_{254}}}} \quad (14)$$

$$i_{253} = \left(\frac{\pi-2}{2}\right)\frac{V_{dc}}{2L_{253}}\sqrt{\frac{L_{253}C_{240B}}{1+\frac{L_{253}}{L_{254}}}} \quad (15)$$

$$i_{254} = \left(\frac{\pi+2}{2}\right)\frac{V_{dc}}{2L_{253}}\sqrt{\frac{L_{253}C_{240B}}{1+\frac{L_{253}}{L_{254}}}} \quad (16)$$

For controller 290B to perform a fault detection method based on the current sensed by a load-side current sensor for autonomous fault detection of upstream and downstream short fault. Accordingly, middle capacitor 240B can be sized to give sufficient delay as given in Equations (17) and (18).

$$I_{threshold} = \left(\frac{\pi+2}{2}\right)\frac{V_{210}}{2L_{253}}\sqrt{\frac{L_{253}C_{240B}}{1+\frac{L_{253}}{L_{254}}}} \quad (17)$$

$$C_{240B} = 16\times\left(\frac{I_{threshold}}{V_{210}(\pi+2)}\right)^2\left(1+\frac{L_{253}}{L_{254}}\right)L_{253} \quad (18)$$

Equation (18) provides a basis for determining a size or capacitance of capacitor 240B based on the threshold current level, based on the voltage generated by power source 210, and further based on inductances 253 and 254. For example, the capacitance of middle capacitor 240B may be proportional to inductance 253 and a square of the threshold level of current. The capacitance of middle capacitor 240B may be inversely proportional to a square of the voltage generated by power source 210 or inversely proportional to a square of the voltage generated by a power converter connected to power source 210. Equation (19) is a generic form of Equation (18) where D1, D2, and D3 are constant values that can be adjusted based on test results or other considerations.

$$C_{240B} = D_1 \times\left(\frac{I_{threshold}}{V_{210}}\right)^2\left(D_2+\frac{L_{253}}{L_{254}}\right)L_{253} + D_3 \quad (19)$$

Figure 11:
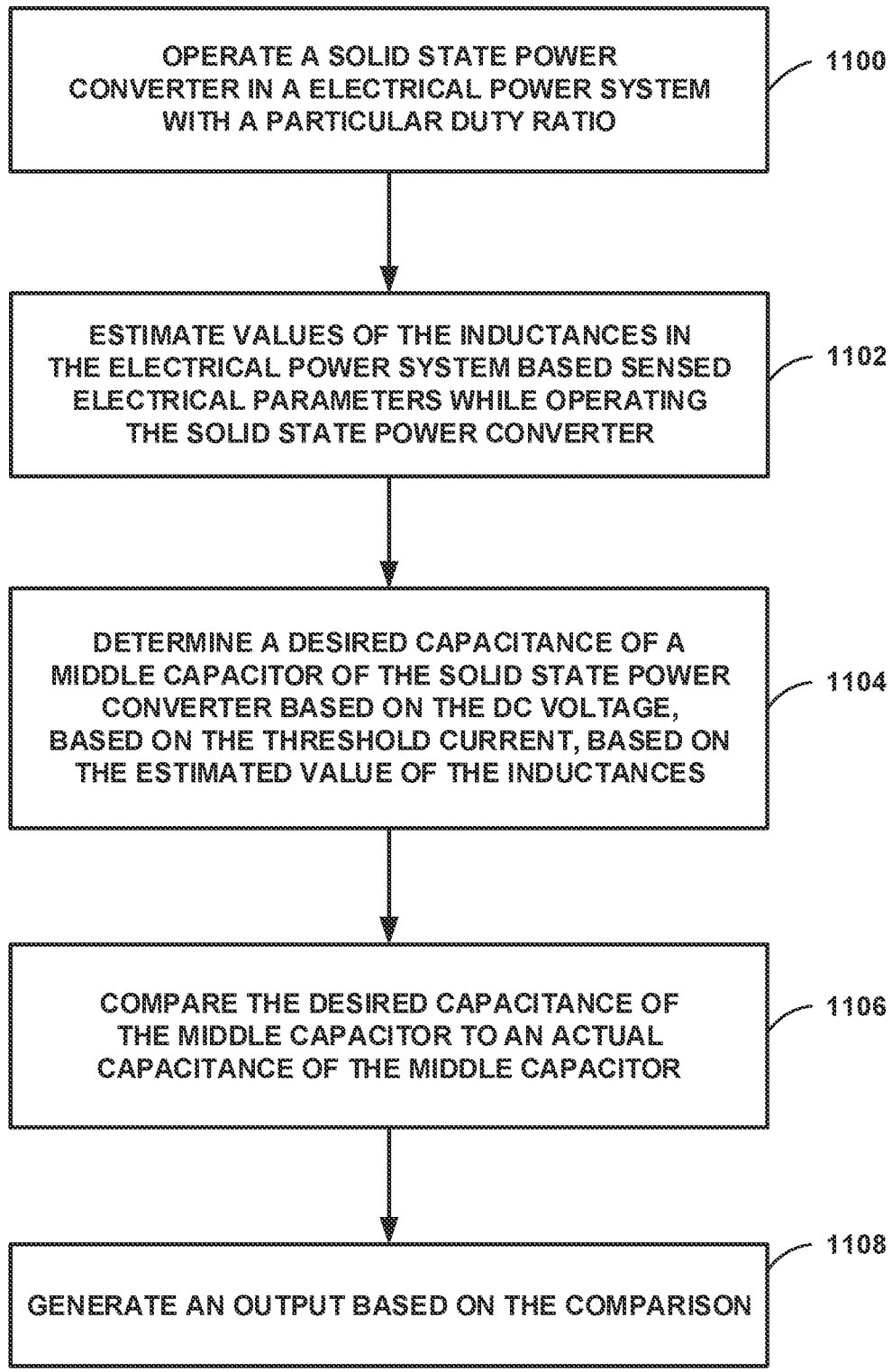
FIG. 11 is a flowchart illustrating an example process for checking the capacitance of a middle capacitor, in accordance with one or more techniques of this disclosure.

FIG. 11 is a flowchart illustrating an example process for checking the capacitance of a middle capacitor, in accordance with one or more techniques of this disclosure. The techniques of FIG. 11 are described with reference to controller 290A shown in FIG. 2, but the techniques of FIG. 11 may be also performed by controller 290B shown in FIG. 2 or by controller 190 shown in FIG. 1. Controllers 190, 290A, and 290B may be configured to perform any of operations 1100 through 1108 shown in FIG. 11, or any and all other techniques described with respect to FIG. 11.

In the example of FIG. 11, controller 290A operates solid state power converter 220A with a particular duty ratio (1100). Controller 290A then received signals from sensors in electrical power system 200, where the signals indicate electrical parameters such as voltage and current in electrical power system 200 during the operation of solid state power converter 220. Controller 290A estimates the values of inductances 251 and 252 based on the received signals (1102). For example, controller 290A may be configured to determine an estimated value of inductance 251 based on the switching frequency and duty ratio of switches 231A-234A. Controller 290A also determines a desired capacitance of middle capacitor 240A based on the DC voltage generated by power source 210, the threshold current for solid state power converter 220A, and the estimated values of inductances 251 and 252 (1104).

In the example of FIG. 11, controller 290A compares the desired capacitance of middle capacitor 240A to an actual capacitance of middle capacitor 240A (1106). The actual capacitance value of middle capacitor 240A may be stored to memory, or controller 290A may be configured to determine the actual capacitance by testing. In response to the comparison of the desired and actual capacitances, controller 290A generates an output (1108). For example, controller 290A may be configured to transmit an alert to another device, where the alert indicates that the actual capacitance is outside of an acceptable range of desired capacitances. Additionally or alternatively, controller 290A may be configured to adjust the actual capacitance of middle capacitor 240A by connecting or disconnecting switchable capacitors of solid state power converter 220A. The switchable capacitors may allow for trimming of the capacitance of middle capacitor 240A. Controller 290A may be configured to also determine an updated value for the threshold current based on the voltage generated by power source 210, the capacitance of middle capacitor 240A, and the estimated values of inductances 251 and 252.

The techniques of FIG. 11 may allow for self-checking and online monitoring of the capacitance of middle capacitor 240A during the operation of solid state power converter 220A. By self-checking the capacitance of middle capacitor 240A, controller 290A can confirm that the threshold current is set to an appropriate value for fault detection. For example, during the working life and operation of solid state power converter 220A, the network impedance may change due to the addition or removal or circuits, loads, power sources, and/or converters. A change in the network impedance may result in the non-suitability of set parameters, which can result in controller 290A trimming the capacitance of middle capacitor 240A or generating an alarm in response to detecting the change.

The following numbered examples demonstrate one or more aspects of the disclosure.

Example 1. A method is for detecting a fault in an electrical power system comprising a bus connected between a first solid state power converter and a second solid state power converter. The method includes receiving, at a controller of the electrical power system, a first signal indicating a current at a source side of the first solid state power converter, wherein the source side of the first solid state power converter is connected to a power source of the electrical power system. The method also includes receiving, at the controller, a second signal indicating a current at the bus and determining, by the controller, that a fault occurred in the electrical power system based on the first signal and further based on the second signal. The method further includes controlling, by the controller, the first solid state power converter in response to determining that the fault occurred.

Example 2. A method is for detecting a fault in an electrical power system comprising a bus connected between a first solid state power converter and a second solid state power converter. The method includes receiving, at a controller of the electrical power system, a first signal indicating a current at the bus and a second signal indicating a current at a load side of the second solid state power converter, wherein the load side of the first solid state power converter is connected to a load of the electrical power system. The method also includes determining, by the controller, that a fault occurred in the electrical power system based on the first signal and further based on the second signal. The method further includes controlling, by the controller, the second solid state power converter in response to determining that the fault occurred.

Example 3. The method of example 1 or example 2, further including determining that a magnitude of the second signal is greater than a first threshold level.

Example 4. The method of the preceding examples or any combination thereof, further including determining that a magnitude of the first signal is less than a second threshold level.

Example 5. The method of the preceding examples or any combination thereof, further including deactivating bus-side switches of the first solid state power converter in response to determining that the magnitude of the second signal is greater than the first threshold level.

Example 6. The method of the preceding examples or any combination thereof, further including deactivating bus-side switches of the first solid state power converter in response to determining that the magnitude of the first signal is less than the second threshold level and in response to determining that the magnitude of the second signal is greater than the first threshold level.

Example 7. The method of the preceding examples or any combination thereof, further including deactivating load-side switches of the second solid state power converter in response to determining that the magnitude of the second signal is greater than the first threshold level.

Example 8. The method of the preceding examples or any combination thereof, further including deactivating load-side switches of the second solid state power converter in response to determining that the magnitude of the first signal is less than the second threshold level and in response to determining that the magnitude of the second signal is greater than the first threshold level.

Example 9. The method of the preceding examples or any combination thereof, further including determining that a magnitude of the first signal is greater than a first threshold level.

Example 10. The method of the preceding examples or any combination thereof, further including determining that a magnitude of the second signal is less than a second threshold level.

Example 11. The method of the preceding examples or any combination thereof, further including deactivating source-side switches of the first solid state power converter in response to determining that the magnitude of the first signal is greater than the first threshold level.

Example 12. The method of the preceding examples or any combination thereof, further including deactivating source-side switches of the first solid state power converter in response to determining that the magnitude of the first signal is greater than the first threshold level and in response to determining that the magnitude of the second signal is less than the second threshold level.

Example 13. The method of the preceding examples or any combination thereof, further including deactivating bus-side switches of the second solid state power converter in response to determining that the magnitude of the first signal is greater than the first threshold level.

Example 14. The method of the preceding examples or any combination thereof, further including deactivating bus-side switches of the second solid state power converter in response to determining that the magnitude of the first signal is greater than the first threshold level and in response to determining that the magnitude of the second signal is less than the second threshold level.

Example 15. The method of the preceding examples or any combination thereof, where the first and the second threshold levels are a same threshold level.

Example 16. The method of the preceding examples or any combination thereof, where the first threshold level is different from the second threshold levels.

Example 17. The method of the preceding examples or any combination thereof, further including determining estimated values of inductances in the electrical power system based on the first signal and the second signal.

Example 18. The method of the preceding examples or any combination thereof, further including determining a desired capacitance for a middle capacitor of the first solid state power converter based on the estimated values of inductances.

Example 19. The method of the preceding examples or any combination thereof, further including controlling a network of switches based on the desired capacitance to trim an actual capacitance of the middle capacitor.

Example 20. A method includes determining estimated values of inductances in an electrical power system based on sensed signals, determining a desired capacitance for a middle capacitor of a solid state power converter in the electrical power system based on the estimated values of inductances, and controlling a network of switches of the solid state power converter based on the desired capacitance to trim an actual capacitance of the middle capacitor.

Example 21. The method of the preceding examples or any combination thereof, wherein determining the desired capacitance is based on the estimated values of inductances, is based on a voltage generated by the power source, and/or a threshold current for the solid state power converter.

Example 22. The method of the preceding examples or any combination thereof, further including trimming the actual capacitance of the middle capacitor by at least connecting or disconnecting capacitors in parallel.

Example 23. The method of the preceding examples or any combination thereof, wherein a capacitance of the middle capacitor is selected based on a threshold level for a current at the load side of the second solid state power converter, a voltage level outputted by a power source, and/or one or more inductances in the electrical power system.

Example 24. The method of the preceding examples or any combination thereof, wherein a capacitance of the middle capacitor is selected based on a formula in which the capacitance of the middle capacitor is proportional to a square of the threshold level for the current at the load side of the second solid state power converter and/or one or more inductances in the electrical power system.

Example 25. A system includes a solid state power converter and a controller configured to perform the method of the preceding examples or any combination thereof.

Example 26. A system includes a first solid state power converter including a first set of switches connected to a source side of the first solid state power converter, a second set of switches connected to a bus side of the first solid state power converter, and a first middle capacitor connected between the first set of switches and the second set of switches. The system also includes a second solid state power converter including a third set of switches connected to a bus side of the second solid state power converter, a fourth set of switches connected to a load side of the second solid state power converter, a second middle capacitor connected between the third set of switches and the fourth set of switches. The system further includes a power source connected to the source side of the first solid state power converter. The system includes a bus connected to the bus side of the first solid state power converter and to the bus side of the second solid state power converter. The system also includes a load connected to the load side of the second solid state power converter.

Example 27. A device includes a computer-readable medium having executable instructions stored thereon, configured to be executable by processing circuitry for causing the processing circuitry to perform the method of examples 1-24 or any combination thereof.

Example 28. A system comprising means for performing each of the method steps of examples 1-24 or any combination thereof.

Various examples have been described. Any combination of the described systems, operations, or functions is contemplated. These and other examples are within the scope of the following claims.

What is claimed is:

1. A method for detecting a fault in an electrical power system comprising a bus connected between a first solid state power converter and a second solid state power converter, the method comprising:
receiving, at a controller of the electrical power system, a first signal indicating a current flowing through a source side of the first solid state power converter, wherein the source side of the first solid state power converter is connected to a power source of the electrical power system, wherein a first load is connected to the bus, and wherein a second load is connected to a load side of the second solid state power converter;
receiving, at the controller, a second signal indicating a current flowing through a bus side of the first solid state power converter to the bus;
determining, by processing circuitry of the controller, that a short circuit fault occurred in the electrical power system based on the first signal and further based on the second signal; and
controlling, by the controller, the first solid state power converter to deactivate switches of the first solid state power converter in response to determining that the short circuit fault occurred, wherein deactivating the switches of the first solid state power converter disrupts current flowing to the first load and the second load.

2. The method of claim 1, further comprising:
determining that a magnitude of the second signal is greater than a threshold level; and
deactivating bus-side switches of the first solid state power converter in response to determining that the magnitude of the second signal is greater than the threshold level.

3. The method of claim 2, wherein the threshold level is a first threshold level, the method further comprising:
determining that a magnitude of the first signal is less than a second threshold level; and
deactivating the bus-side switches in response to determining that the magnitude of the first signal is less than the second threshold level and in response to determining that the magnitude of the second signal is greater than the first threshold level.

4. The method of claim 1, further comprising:
determining that a magnitude of the first signal is greater than a threshold level; and deactivating source-side switches of the first solid state power converter in response to determining that the magnitude of the first signal is greater than the threshold level.

5. The method of claim 4, wherein the threshold level is a first threshold level, the method further comprising:
determining that a magnitude of the second signal is less than a second threshold level; and
deactivating the source-side switches in response to determining that the magnitude of the first signal is greater than the first threshold level and in response to determining that the magnitude of the second signal is less than the second threshold level.

6. The method of claim 1, further comprising:
determining estimated values of inductances in the electrical power system based on the first signal and the second signal;
determining a desired capacitance for a middle capacitor of the first solid state power converter based on the estimated values of inductances; and
controlling a network of switches based on the desired capacitance to trim an actual capacitance of the middle capacitor.

7. The method of claim 1, wherein the controller of the electrical power system is a first controller of one or more controllers of the electrical power system, wherein a first load receives electrical power from the bus, the method further comprising:
receiving, at the one or more controllers, a third signal indicating a current flowing through a bus side of the second solid state power converter, wherein the source side of the second solid state power converter is connected to the bus;
receiving, at the one or more controllers, a fourth signal indicating a current flowing through the load side of the second solid state power converter to the second load;
determining, by the one or more controllers, that a short circuit fault occurred in the electrical power system based on the third signal and further based on the fourth signal; and
controlling, by the one or more controllers, the second solid state power converter to deactivate switches of the second solid state power converter in response to determining that the short circuit fault occurred, wherein deactivating the switches of the second solid state power converter does not reduce the electrical power received by the first load.

8. A system comprising:
a first solid state power converter including:
a first set of switches connected to a source side of the first solid state power converter;
a second set of switches connected to a bus side of the first solid state power converter; and
a first middle capacitor connected between the first set of switches and the second set of switches;
a second solid state power converter including:
a third set of switches connected to a bus side of the second solid state power converter;
a fourth set of switches connected to a load side of the second solid state power converter; and
a second middle capacitor connected between the third set of switches and the fourth set of switches;
a power source connected to the source side of the first solid state power converter;
a bus connected to the bus side of the first solid state power converter and to the bus side of the second solid state power converter;
a first load connected to the bus;
a second load connected to the load side of the second solid state power converter; and
a controller configured to open one or more of the fourth set of switches in response to detecting a fault, wherein opening the one or more of the fourth set of switches disrupts current flowing to the second load without disrupting current flowing to the first load.

9. The system of claim 8, wherein a capacitance of the second middle capacitor is selected based on a threshold level for a current in the second solid state power converter, a voltage level outputted by the power source, a first inductance at the bus side of the second solid state power converter, and a second inductance at the load side of the second solid state power converter.

10. The system of claim 9, wherein the capacitance of the second middle capacitor is selected based on a formula in which the capacitance of the second middle capacitor is proportional to:
a square of the threshold level for the current at the load side of the second solid state power converter; and
the first inductance at the bus side of the second solid state power converter.

11. The system of claim 8, further comprising a first controller including processing circuitry, wherein the first controller is configured to:
receive a first signal indicating a current at the source side of the first solid state power converter;
receive a second signal indicating a current at a bus side of the first solid state power converter; and
control the first solid state power converter,
wherein the processing circuitry of the first controller is configured to:
determine that the fault occurred in the electrical power system based on the first signal and further based on the second signal; and
cause the first controller to deactivate at least one switch of the first solid state power converter in response to determining that the fault occurred.

12. The system of claim 11, wherein the processing circuitry is configured to:
determine that a magnitude of the second signal is greater than a threshold level; and
cause the first controller to deactivate the second set of switches in response to determining that the magnitude of the second signal is greater than the threshold level.

13. The system of claim 12, wherein the threshold level is a first threshold level, and wherein the processing circuitry is configured to:
determine that a magnitude of the first signal is less than a second threshold level; and
cause the first controller to deactivate the second set of switches in response to determining that the magnitude of the first signal is less than the second threshold level and in response to determining that the magnitude of the second signal is greater than the first threshold level.

14. The system of claim 11, wherein the processing circuitry is configured to:
determine that a magnitude of the first signal is greater than a threshold level; and
cause the first controller to deactivate the first set of switches in response to determining that the magnitude of the first signal is greater than the threshold level.

15. The system of claim 14, wherein the threshold level is a first threshold level, and wherein the processing circuitry is configured to:

determine that a magnitude of the second signal is less than a second threshold level; and cause the first controller to deactivate the first set of switches in response to determining that the magnitude of the first signal is greater than the first threshold level and in response to determining that the magnitude of the second signal is less than the second threshold level.

16. The system of claim 11, wherein the first middle capacitor comprises an array of switchable capacitors, wherein the first solid state power converter further comprises a network of switches configured to connect and disconnect the array of switchable capacitors to the first and second set of switches, and wherein the processing circuitry is configured to:
determine estimated values of inductances in the electrical power system based on the first signal and the second signal;
determine a desired capacitance for the first middle capacitor based on the estimated values of inductances; and
control the network of switches based on the desired capacitance to trim an actual capacitance of the middle capacitor.

17. The system of claim 8, further comprising a second controller including processing circuitry, wherein the second controller is configured to:

receive a first signal indicating a current at the bus side of the second solid state power converter;
receive a second signal indicating a current at a load side of the second solid state power converter; and
control the second solid state power converter,
wherein the processing circuitry of the second controller is configured to:
determine that the fault occurred in the electrical power system based on the first signal and further based on the second signal; and
cause the second controller to deactivate at least one switch of the second solid state power converter in response to determining that the fault occurred.

18. The system of claim 17, wherein the processing circuitry is configured to:

determine that a magnitude of the second signal is greater than a first threshold level;
determine that a magnitude of the first signal is less than a second threshold level; and
cause the second controller to deactivate the fourth set of switches in response to determining that the magnitude of the first signal is less than the second threshold level and in response to determining that the magnitude of the second signal is greater than the first threshold level.

19. The system of claim 17, wherein the processing circuitry is configured to:

determine that a magnitude of the first signal is greater than a first threshold level;
determine that a magnitude of the second signal is less than a second threshold level; and
cause the second controller to deactivate the third set of switches in response to determining that the magnitude of the second signal is less than the second threshold level and in response to determining that the magnitude of the first signal is greater than the first threshold level.

20. A device comprising a computer-readable storage medium having executable instructions stored thereon, configured to be executable by processing circuitry of the device for causing the processing circuitry to:

receive a first signal, at a controller of the electrical power system, indicating a current at a source side of a first solid-state power converter of an electrical power system, wherein the source side of the first solid state power converter is connected to a power source of the electrical power system;
receive a second signal, at the controller, indicating a current at a bus connected between the first solid state power converter and a second solid state power converter of the electrical power system;
determine, by the one or more controllers, that a short circuit fault occurred in the electrical power system based on the first signal and further based on the second signal;
control, by the controller, the first solid state power converter to deactivate switches in response to determining that the short circuit fault occurred; and
wherein the controller of the electrical power system is a first controller of one or more controllers of the electrical power system, wherein a first load receives electrical power from the bus, further causing the processing circuitry to:
receive, at the one or more controllers, a third signal indicating a current flowing through a bus side of the second solid state power converter, wherein the source side of the second solid state power converter is connected to the bus;
receive, at the one or more controllers, a fourth signal indicating a current flowing through a load side of the second solid state power converter to a second load;
determine, by the one or more controllers, that a short circuit fault occurred in the electrical power system based on the third signal and further based on the fourth signal; and
control, by the one or more controllers, the second solid state power converter to deactivate switches of the second solid state power converter in response to determining that the short circuit fault occurred, wherein deactivating the switches of the second solid state power converter does not reduce the electrical power received by the first load.

* * * * *